(12) United States Patent
Saiki

(10) Patent No.: US 10,471,954 B2
(45) Date of Patent: Nov. 12, 2019

(54) COLLISION AVOIDANCE SUPPORT DEVICE

(71) Applicant: TOYOTA JIDOSHA KABUSHIKI KAISHA, Toyota-shi, Aichi-ken (JP)

(72) Inventor: Kotaro Saiki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 33 days.

(21) Appl. No.: 15/849,198

(22) Filed: Dec. 20, 2017

(65) Prior Publication Data

US 2018/0178783 A1 Jun. 28, 2018

(30) Foreign Application Priority Data

Dec. 22, 2016 (JP) ................................. 2016-249113

(51) Int. Cl.
*B60W 30/09* (2012.01)
*G08G 1/16* (2006.01)
(Continued)

(52) U.S. Cl.
CPC ........ *B60W 30/09* (2013.01); *B60W 30/0956* (2013.01); *G08G 1/165* (2013.01); *G08G 1/166* (2013.01); *B60W 50/14* (2013.01); *B60W 2050/143* (2013.01); *B60W 2050/146* (2013.01); *B60W 2520/105* (2013.01); *B60W 2520/14* (2013.01); *B60W 2520/28* (2013.01);
(Continued)

(58) Field of Classification Search
CPC .. B60W 30/09; B60W 30/0956; G08G 1/165; G08G 1/166
See application file for complete search history.

(56) References Cited

U.S. PATENT DOCUMENTS 8,775,006 B2\* 7/2014 Moshchuk ............ B60W 50/08
340/436
2010/0104199 A1\* 4/2010 Zhang ................ G06K 9/00798
382/199
(Continued)

FOREIGN PATENT DOCUMENTS

JP 2007257338 A 10/2007
JP 2008-179251 A 8/2008
(Continued)

*Primary Examiner* — Anne M Antonucci
*Assistant Examiner* — Renee LaRose
(74) *Attorney, Agent, or Firm* — Hunton Andrews Kurth LLP

(57) ABSTRACT

A collision avoidance support device comprises: target detection unit for detecting an target existing in front of a vehicle travelling on a road; target type determination unit for detecting which of a moving object and a stationary object the target detected by the target detection unit is; obstacle determination unit for determining whether or not the target detected by the target detection unit is an obstacle which is likely to collide with the vehicle; and traveling direction automatic control unit. The traveling direction automatic control unit is configured to calculate the selected avoidance path so that the distance margin of when the obstacle determination unit determines that the obstacle is the moving object is larger than the distance margin of when the obstacle determination unit determines that the obstacle is the stationary object.

3 Claims, 13 Drawing Sheets

(51) Int. Cl.
*B60W 30/095* (2012.01)
*B60W 50/14* (2012.01)

(52) U.S. Cl.
CPC ..... *B60W 2550/10* (2013.01); *B60W 2550/20* (2013.01); *B60W 2710/182* (2013.01); *B60W 2710/202* (2013.01); *B60W 2720/24* (2013.01)

(56) References Cited

U.S. PATENT DOCUMENTS

2015/0066241 A1  3/2015  Akiyama
2017/0057498 A1  3/2017  Katoh

FOREIGN PATENT DOCUMENTS

| | | |
|---|---|---|
| JP | 2011237984 A | 11/2011 |
| JP | 2012238151 A | 6/2012 |
| JP | 2017-043262 A | 3/2017 |
| WO | 2013157111 A1 | 10/2013 |
| WO | 2014091611 A | 6/2014 |

\* cited by examiner

COLLISION AVOIDANCE SUPPORT DEVICE

CROSS-REFERENCE TO RELATED APPLICATION

The present application claims priority to Japanese Patent Application No. 2016-249113 filed on Dec. 22, 2016, which is incorporated herein by reference in its entirety.

BACKGROUND OF THE INVENTION

1. Field of the Invention

The present invention relates to a collision avoidance support device, which is configured to support a driver so that a vehicle avoids collision with an obstacle.

2. Description of the Related Art

Hitherto, there has been known a vehicle including a collision avoidance support device (for example, Japanese Patent Application Laid-open No. 2008-179251).

The collision avoidance support device executes automatic steering control (traveling direction automatic control) which causes a vehicle to avoid colliding with an obstacle when, for example, the obstacle with which the vehicle is highly likely to collide is detected by a camera or/and a radar sensor.

Specifically, the collision avoidance support device of the vehicle travelling on a road firstly calculates an avoidance path through which the vehicle pass to avoid collision with the obstacle. This avoidance path is calculated so that a distance margin, which is a distance to the obstacle in a width direction of the road, is larger than a predetermined distance.

Next, the collision avoidance support device changes steering angles of steered wheels of the vehicle so that the vehicle travels along the calculated avoidance path.

An obstacle may be a moving object or a stationary object.

However, the conventional collision avoidance support device calculates the avoidance path without considering which of a moving object and a stationary object the obstacle is. In other words, a distance margin calculated by the conventional collision avoidance support device when the obstacle is a moving object and a distance margin calculated by the conventional collision avoidance support device when the obstacle is a stationary object are the same as each other.

However, the obstacle being a moving object may moves as time proceeds. In other words, a distance margin at the time when the vehicle passes through the side of the moving object along the avoidance path may be smaller than a distance margin at the time when the collision avoidance support device calculated the avoidance path.

Meanwhile, the obstacle being the stationary object does not move.

Thus, no problem occurs when a distance margin between the avoidance path, which is calculated by the collision avoidance support device, and the obstacle is small.

In other words, when the calculated distance margin is large more than necessary in a case where the obstacle is a stationary object, a turning radius of the vehicle when the vehicle travels along the avoidance path becomes small more than necessary. Thus, the behavior of the vehicle may be unstable more than necessary.

SUMMARY OF THE INVENTION

The present invention has been made in order to solve the above-mentioned problem. Specifically, it is an object of the present invention to provide a collision avoidance support device capable of calculate an appropriate avoidance path of a vehicle to avoid a collision with an obstacle depending on which of a moving object and a stationary object is an obstacle being likely to collide with the vehicle.

In order to achieve the above-mentioned object, according to one embodiment of the present invention, there is provided a collision avoidance support device including:

target detection means (28) for detecting an target (80, 98) existing in front of a vehicle (10) travelling on a road (70);

target type determination means (29b, 33) for detecting which of a moving object and a stationary object the target detected by the target detection means is;

obstacle determination means (34) for determining whether or not the target detected by the target detection means is an obstacle which is likely to collide with the vehicle; and traveling direction automatic control means (18, 50).

The traveling direction automatic control means is configured to:

calculate an avoidance path which is a travelling path of the vehicle to avoid a collision with the obstacle;

identify the avoidance path as a selected avoidance path (Rfm, Rfs) when a distance margin (Dsx) which is a distance between the avoidance path and the obstacle in a width direction of the road is larger than a predetermined limit value (Vlm, Vls); and execute traveling direction automatic control of changing a traveling direction of the vehicle so that the vehicle travels along the selected avoidance path.

The traveling direction automatic control means is configured to calculate the selected avoidance path so that the distance margin of when the obstacle determination means determines that the obstacle is the moving object is larger than the distance margin of when the obstacle determination means determines that the obstacle is the stationary object.

The selected avoidance path calculated by the traveling direction automatic control means of the present invention when the obstacle determination means determines that the obstacle is a moving object and the selected avoidance path calculated by the traveling direction automatic control means when the obstacle determination means determines that the obstacle is a stationary object are different from each other.

Namely, the distance margin between the selected avoidance path calculated by the traveling direction automatic control means when the obstacle determination means determines that the obstacle is a moving object and the obstacle is larger than the distance margin when the obstacle determination means determines that the obstacle is a stationary object.

When the obstacle is a moving object, this obstacle may moves as time proceeds.

However, the distance margin calculated by the traveling direction automatic control means in this case is larger than the distance margin when the obstacle determination means determines that the obstacle is a stationary object.

Thus, when the traveling direction automatic control means executes the traveling direction automatic control so that the vehicle travels along the selected avoidance path calculated by the traveling direction automatic control means, the vehicle is highly unlikely to collide with the obstacle being a moving object.

Meanwhile, when the obstacle is a stationary object, the distance margin calculated by the traveling direction automatic control means is smaller than the distance margin when the obstacle determination means determines that the obstacle is a moving object.

However, the obstacle being a stationary object does not move.

Thus, the vehicle is highly unlikely to collide with the obstacle being a stationary object even when the distance margin between the selected avoidance path, which is calculated by the collision avoidance support device, and the obstacle is small.

Furthermore, a turning radius of the vehicle when the vehicle travels along the selected avoidance path does not become small more than necessary because the distance margin is small. Thus, the behavior of the vehicle is highly unlikely to be unstable more than necessary.

In one of aspects of the present invention, the traveling direction automatic control means is configured to:

calculate a predicted path (B1) which is the avoidance path obtained by adding a maximum change amount of a lateral force capable of acting on the vehicle in a moving direction (LT) parallel to a width of the road to a lateral acceleration currently acting on the vehicle in the moving direction when the obstacle determination means determines that the moving object moving with respect to the road in the moving direction is the obstacle; and identify the predicted path as the selected avoidance path when the distance margin between the predicted path and the obstacle is larger than a predetermined moving obstacle limit value (Vlm) which is the limit value.

According to this one of aspects of the present invention, when the obstacle is a moving object, the traveling direction automatic control means requires smaller period of time to calculate the selected avoidance path.

Furthermore, calculation load of the traveling direction automatic control means becomes smaller.

In one of aspects of the present invention, the traveling direction automatic control means is configured to:

calculate collision avoidance distances (Dsl, Dsr), which are distances in the width direction of the road and are distances of left and right collision avoidance spaces positioned on both left and right sides of the obstacle respectively, when the obstacle determination means determines that the stationary object is the obstacle;

select one of the left and right collision avoidance spaces as a selected collision avoidance space, the one of left and right collision avoidance spaces having the collision avoidance distance longer than the collision avoidance distance of the other of left and right collision avoidance spaces;

be able to calculate a plurality of the avoidance paths passing through the selected collision avoidance space as a plurality of the predicted paths in a predetermined order, the plurality of the avoidance paths corresponding to a plurality of values, which are each obtained by changing the lateral acceleration currently acting on the vehicle in the width direction of the road by a fixed amount, respectively; and stop calculating the predicted paths and identify the predicted path having the distance margin larger than a predetermined stationary obstacle limit value (Vls), which is the limit value, when the distance margin becomes larger than the stationary obstacle limit value.

According to this one of aspects of the present invention, when the obstacle is a stationary object, the traveling direction automatic control means requires smaller period of time to calculate the selected avoidance path.

Furthermore, calculation load of the traveling direction automatic control means becomes smaller.

In one of aspects of the present invention, further comprises relative position determination means (31) for detecting relative position between one travel lane (71), on which the vehicle travels, and the target, the travel lane being part of the road.

The target type determination means (33) is configured to determine that the target is the moving object when the relative position determination means detects that the target is positioned between a pair of white lines (73, 74) which are formed on left and right side ends of the travel lane respectively.

In general, it is known that a possibility of a target on a travel lane of a road being a moving object is relatively high. In other words, it is known that a possibility of a target positioned between left and right white lines of a travel lane being a moving object is relatively high.

Thus, according to this one of aspects of the present invention, whether or not the target is a moving object can be determined with a certain reliability.

In one of aspects of the present invention, the target type determination means is configured to determine that the target is the moving object when the target detected by the target detection means is a pedestrian (80).

A pedestrian is highly likely to move.

Thus, according to this one of aspects of the present invention, when the target detected by the target detection means is a pedestrian, the target type determination means can determine that this target is a moving object with higher reliability.

In one of aspects of the present invention, the target type determination means is configured to determine that the target is the stationary object when the target detected by the target detection means is a long object (98) which extends in a traveling direction of the vehicle and has a length equal to or more than a predetermined distance threshold (Thleg).

It is known that a long object extending in the traveling direction of the vehicle and having a length equal to or more than the predetermined distance threshold is highly likely to be a stationary object.

Thus, according to this one of aspects of the present invention, when the target detected by the target detection means is a long object, the target type determination means can determine that this target is a stationary object with higher reliability.

It should be noted that, for example, there is a large-sized vehicle being a moving object whose entire length is 20 meters.

Thus, the distance threshold is desirably set to a value (e.g., 30 meters) longer than the entire length of a large-sized vehicle.

In one of aspects of the present invention, the traveling direction automatic control means is configured to be prohibited from executing the traveling direction automatic control when the target, which is detected by the target detection means, is different from the pedestrian and the long object.

As described above, the reliability of determining that a target is a moving object when the target is a pedestrian, and the reliability of determining that a target is a stationary object when the target is a long object extending in the traveling direction of the vehicle and having a length equal to or more than the predetermined distance threshold are high.

In other words, the reliability of determining that a target different from a pedestrian and a long object is a moving object or a stationary object is not higher compared with the case where the target is a moving object or a stationary object.

Thus, in a case where the target is different from the pedestrian and the long object, the target type determination means is likely to erroneously determine that this target is a stationary object although the target is, in fact, a moving object. Similarly, the target type determination means is likely to erroneously determine that this target is a moving object although the target is, in fact, a stationary object.

However, according to this one of aspects of the present invention, when the target is different from the pedestrian and the long object, the traveling direction automatic control means is prohibited from executing the traveling direction automatic control.

Thus, in a case where the target is different from the pedestrian and the long object, the traveling direction automatic control means does not identify the selected avoidance path on the assumption that the obstacle is a stationary object when this target is, in fact, a moving object. Similarly, in a case where the target is different from the pedestrian and the long object, the traveling direction automatic control means does not identify the selected avoidance path on the assumption that the obstacle is a moving object when this target is, in fact, a stationary object.

In the description given above, in order to facilitate understanding of the present invention, names and/or reference symbols in parentheses used in an embodiment of the present invention described later are added to components of the invention corresponding to the embodiment. However, respective components of the present invention are not limited to the embodiment prescribed by the reference symbols. Other objects, other features, and accompanying advantages of the present invention can be readily understood from a description of the embodiment of the present invention provided referring to the accompanying drawings.

DESCRIPTION OF THE EMBODIMENTS

Now, referring to the accompanying drawings, description is given of a vehicle (automobile) 10 to which a collision avoidance support device according to an embodiment of the present invention is mounted.

Figure 1:
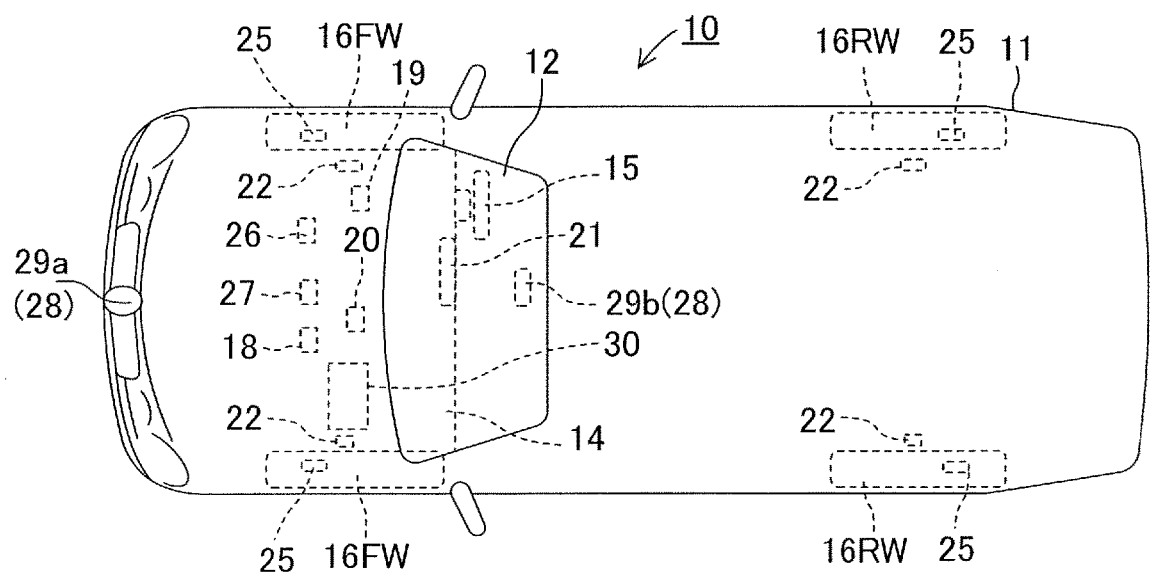
FIG. 1 is a plan view of a vehicle to which a collision avoidance support device according to an embodiment of the present invention is mounted.

As illustrated in FIG. 1, a windshield 12 formed of a transmissive material (e.g., glass or resin) is fixed to a vehicle body 11 of the vehicle 10.

A dashboard 14 is fixed to a front part of the inside of the vehicle 10. A steering wheel 15 is rotatably supported in a right-side part of the dashboard 14.

The vehicle 10 further includes a pair of left and right front wheels 16FW and a pair of left and right rear wheels 16RW. The left and right front wheels 16FW are steered wheels.

A collision avoidance support mode selection switch (not shown) is arranged on the dashboard 14.

When the collision avoidance support mode selection switch is positioned at an on position, a support ECU 30, a brake ECU 40, a steering ECU 50, and an alert ECU 60 execute collision avoidance support control (alert control, automatic brake control, and automatic steering control) described later. Meanwhile, when the collision avoidance support mode selection switch is positioned at an off position, the support ECU 30, the brake ECU 40, the steering ECU 50, and the alert ECU 60 do not execute the collision avoidance support control.

Figure 2:
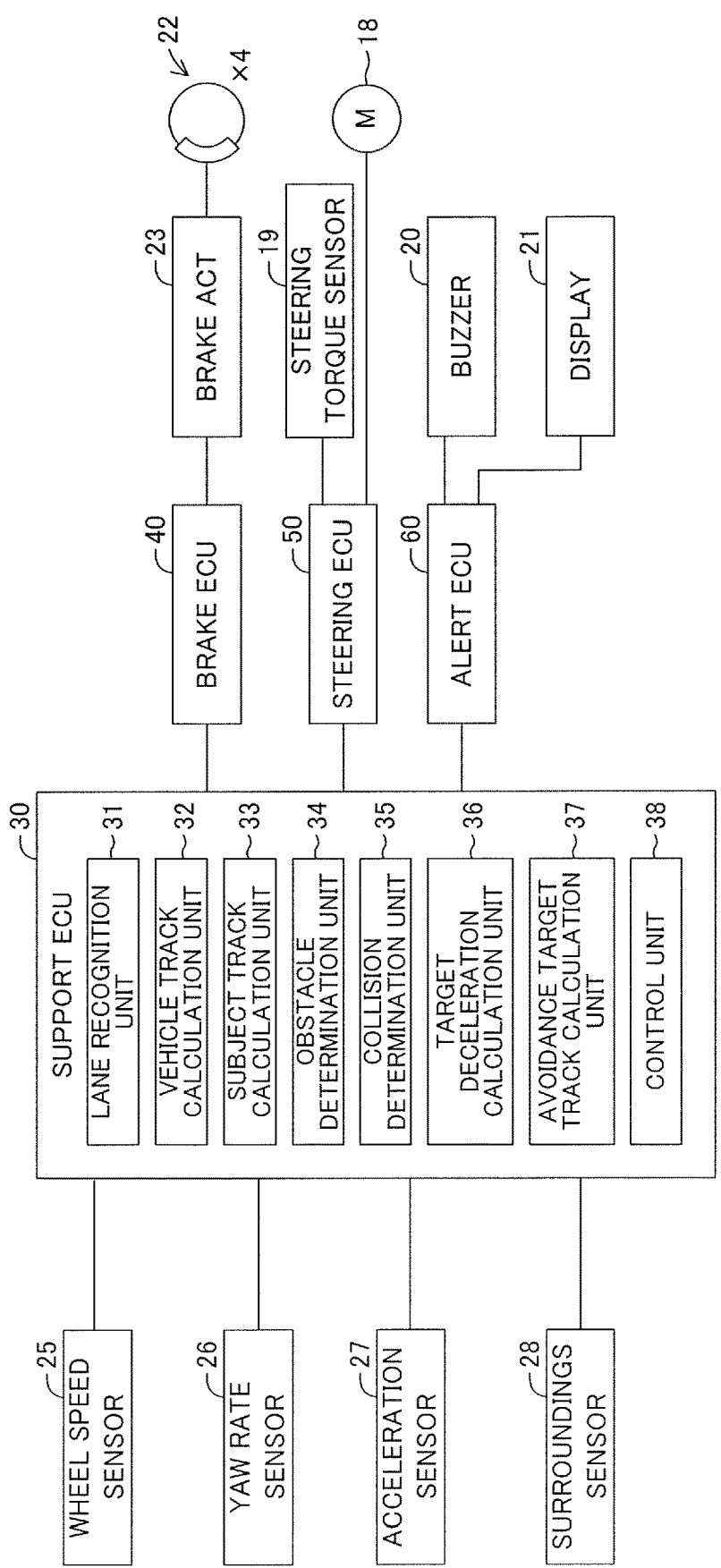
FIG. 2 is a system configuration diagram of the collision avoidance support device.

The steering wheel 15 and the left and right front wheels 16FW are connected to each other via a known electric power steering mechanism. Only a part of components of the electric power steering mechanism is illustrated in FIG. 1 and FIG. 2.

The electric power steering mechanism includes a rack shaft extending in a left-and-right direction of the vehicle and slidable in the left-and-right direction. A pair of left and right tie rods is connected to left and right ends of the rack shaft, and the left and right tie rods are connected to left and right carriers. The left and right carriers are rotatable about king pin axes with respect to the vehicle body 11. Further, the left and right carriers rotatably support the left and right front wheels 16FW about a horizontal axis, respectively. A pinion shaft meshes with a thread groove formed in the rack shaft. One end (lower end) of a steering shaft is connected to the pinion shaft via a universal joint. Further, the steering wheel 15 is fixed to the other end (upper end) of the steering shaft.

Accordingly, when the steering wheel 15 is rotated, this rotation force is transmitted to the steering shaft, the universal joint, and the pinion shaft. Then, the rack shaft meshing with the pinion shaft slides in one direction out of the left and right directions, and thus steering angles of the left and right front wheels 16FW linked to the rack shaft via the tie rods and the carriers change.

The electric power steering mechanism further includes an electric motor 18. The electric motor 18 is linked to the rack shaft via a speed reduction mechanism.

The electric power steering mechanism further includes a steering torque sensor 19 for detecting a steering torque (torsion angle) of a torsion bar, which forms a middle portion of the steering shaft.

For example, when the steering torque is generated in the steering shaft as a result of a driver's operation of the steering wheel 15 for rotation, the steering ECU 50 described later calculates a target steering assist torque based on the steering torque detected by the steering torque sensor 19. Further, the steering ECU 50 controls the electric motor 18 for rotation to cause the electric motor 18 to output a rotation force corresponding to the target steering assist torque. Then, a torque generated by the electric motor 18 is transmitted to the rack shaft, and thus the steering assist is executed.

Further, as illustrated in FIG. 1 and FIG. 2, the vehicle 10 includes a buzzer 20, a display 21, and four friction brake mechanisms 22.

The buzzer 20 is capable of beeping.

The display 21 is a liquid crystal display fixed to the dashboard 14.

Each of the friction brake mechanisms 22 is connected to a brake actuator 23. The brake actuator 23 is arranged in a hydraulic circuit, which is arranged between a master cylinder (not shown) configured to pressurize a hydraulic fluid when a brake pedal is stepped on and each of the friction brake mechanisms 22. When the brake pedal is stepped on, the hydraulic fluid pressurized by the master cylinder is supplied from the brake actuator 23 to the friction brake mechanisms 22, to thereby apply braking forces to the front wheels 16FW and the rear wheels 16RW by the respective friction brake mechanisms 22.

The vehicle 10 further includes wheel speed sensors 25, a yaw rate sensor 26, and an acceleration sensor 27.

The wheel speed sensors 25 are arranged so as to correspond to the respective front wheels 16FW and rear wheels 16RW. Each of the wheel speed sensors 25 is configured to detect a wheel speed of a corresponding one of the front wheels 16FW and the rear wheels 16RW.

The yaw rate sensor 26 is configured to detect a yaw rate of the vehicle 10.

The acceleration sensor 27 is configured to detect a longitudinal acceleration acting in a front-and-rear direction of the vehicle 10 and a lateral acceleration acting in the left-and-right direction (vehicle width direction) of the vehicle 10.

The vehicle 10 further includes a surroundings sensor 28. The surroundings sensor 28 includes a radar sensor 29a and a camera 29b.

The radar sensor 29a fixed to a front end of the vehicle body 11 is configured to radiate a millimeter radio wave around (including at least a front side of) the vehicle 10. When the radio wave radiated by the radar sensor 29a is reflected by, for example, a reflector (e.g., a pedestrian) positioned around the vehicle 10, the radar sensor 29a receives the reflected wave. Then, calculation means built in the radar sensor 29a calculates, based on radiation and reception timings of the radio wave, presence or absence of the reflector and a relative relationship between the vehicle 10 and the reflector (e.g., the distance between the vehicle 10 and the reflector and a relative speed between the vehicle 10 and the reflector).

The camera 29b is arranged inside the vehicle 10 so as to be positioned immediately behind the windshield 12, and is formed using a stereo camera.

The camera 29b is configured to image a subject (e.g., a pedestrian) positioned in front of the windshield 12.

Calculation means built in the camera 29b identifies a type of the subject contained in imaged data acquired by the camera 29b through pattern matching that uses the imaged data.

A subject may be a moving object or a stationary object. Examples of the moving object include a pedestrian, a bicycle, and a vehicle (automobile). Examples of the stationary object include a sign board, a utility pole, a tree, and a guard rail.

As described later, based on a change in position of the subject detected from the imaged data, it can be determined which of the moving object and the stationary object the subject is.

The camera 29b is also capable of imaging (recognizing) left and right white lines (lane markers) of a road. The calculation means built in the camera 29b calculates the shape of the road and a positional relationship between the road and the vehicle 10. The calculation means of the camera 29b calculates a positional relationship between the road and the subject. In other words, the calculation means of the camera 29b recognizes whether or not the subject is positioned between left and right white lines of a travel lane of the road.

Information acquired in this manner by the surroundings sensor 28 is herein referred to as "target information".

As illustrated in FIG. 2, the collision avoidance support device according to this embodiment includes the support ECU 30, the brake ECU 40, the steering ECU 50, and the alert ECU 60.

The respective ECUs 30, 40, 50, and 60 include microcomputers as main components, and are mutually connected to one another via a controlled area network (CAN) (not shown) for reception and transmission of various types of control information and request signals. "ECU" is an abbreviation of electric control unit. The microcomputer herein includes a CPU and storage devices (e.g., a ROM and a RAM), and the CPU is configured to implement various functions by executing instructions (programs) stored in the ROM.

The support ECU 30 is connected to the wheel speed sensors 25, the yaw rate sensor 26, the acceleration sensor 27, and the surroundings sensor 28.

The wheel speed sensors 25, the yaw rate sensor 26, the acceleration sensor 27, and the surroundings sensor 28 are configured to repeatedly transmit their detection results to the support ECU 30 at predetermined cycles (intervals).

As described later, the support ECU 30 determines, based on the imaged data transmitted from the surroundings sensor 28, whether or not the vehicle 10 is highly likely to collide with the subject (obstacle), which is a target within the imaged data. Then, when it is determined that "the vehicle 10 is highly likely to collide with the subject", the support ECU 30 controls the brake ECU 40, the steering ECU 50, and the alert ECU 60. A specific method of controlling the brake ECU 40, the steering ECU 50, and the alert ECU 60 by the support ECU 30 is described later.

The brake ECU 40 is connected to the brake actuator 23.

Thus, even in a case where the brake pedal is not stepped on, when the brake actuator 23 receives an operation signal from the brake ECU 40, the brake actuator 23 supplies the hydraulic fluid to each of the friction brake mechanisms 22. Accordingly, also in this case, each of the friction brake mechanisms 22 applies braking forces to the corresponding front wheels 16FW and the corresponding rear wheels 16RW.

The steering ECU 50 is a device configured to control the electric power steering mechanism, and is connected to the electric motor 18 and the steering torque sensor 19.

As described above, when the driver operates the steering wheel 15 for rotation, the steering ECU 50 controls the electric motor 18 for rotation to execute a steering assist.

Further, in a case where the driver does not operate the steering wheel 15 for rotation, when the steering ECU 50 receives an operation signal for collision avoidance transmitted from the support ECU 30, the steering ECU 50 controls the electric motor 18 for rotation in accordance with the operation signal to steer the front wheels 16FW.

The alert ECU 60 is connected to the buzzer 20 and the display 21.

When the vehicle 10 is highly likely to collide with the subject, the alert ECU 60 operates in accordance with an operation signal transmitted from the support ECU 30. Specifically, the alert ECU 60 causes the buzzer 20 to beep to alert the driver to the possibility of collision, and causes the display 21 to display an operation state of the collision avoidance support control.

Next, functions of the support ECU 30 are described. From the functional viewpoint of the support ECU 30, the support ECU 30 includes a lane recognition unit 31, a vehicle track calculation unit 32, a subject track calculation unit 33, an obstacle determination unit 34, a collision determination unit 35, a target deceleration calculation unit 36, an avoidance target track calculation unit 37, and a control unit 38.

The lane recognition unit 31 is configured to generate information on a road on which the vehicle 10 travels based on the target information transmitted from the surroundings sensor 28. For example, the lane recognition unit 31 uses a two-dimensional coordinate system having an origin at a center of the front end of the vehicle 10 and extending in the left and right directions and the front direction from the origin to generate coordinate information (positional information) on each of ground, the subject, and the left and right white lines of the road. In this manner, the lane recognition unit 31 recognizes the shape of the travel lane of the vehicle 10 defined by the left and right white lines, the position and direction of the vehicle 10 within the travel lane, and relative positions of the ground and the subject (reflector, which may be an obstacle) with respect to the vehicle 10. The lane recognition unit 31 updates the coordinate information every time the lane recognition unit 31 receives the target information transmitted from the surroundings sensor 28.

The vehicle track calculation unit 32 is configured to calculate a turning radius of the vehicle 10 based on the yaw rate detected by the yaw rate sensor 26 and a vehicle speed, which is calculated through use of the wheel speeds detected by the wheel speed sensors 25. The vehicle track calculation unit 32 is further configured to calculate a track of the vehicle 10 based on the calculated turning radius. The track of the vehicle 10 is a change in position of the vehicle 10 during a period of time from a current time until a predetermined period of time passes, and has a predetermined width orthogonal in plan view to a traveling direction of the vehicle 10. The track of the vehicle 10 calculated in this manner is hereinafter referred to as "predicted vehicle track".

The subject track calculation unit 33 is configured to determine, based on information on a change in position of the subject acquired from the imaged data, which of the moving object and the stationary object the subject is. In other words, the subject track calculation unit 33 determines the type of the subject.

Specifically, when the camera 29b identifies the type of the subject within the imaged data through pattern matching, the camera 29b assigns an individual ID (identification information) to each subject. Then, the subject track calculation unit 33 uses the ID to identify each subject within the imaged data, and determines whether or not each subject has changed its position within a predetermined period of time. For example, when a given subject has changed its position within the predetermined period of time, the subject track calculation unit 33 determines that "this subject is a moving object". Meanwhile, when a given subject has not changed its position within the predetermined period of time, the subject track calculation unit 33 determines that "this subject is a stationary object". This subject type determination method is hereinafter referred to as "determination method using position change information".

Further, the lane recognition unit 31 determines whether each subject is a moving object or a stationary object based on the information on "whether or not the subject is positioned between left and right white lines of a travel lane of the road". The camera 29b transmits this information to the lane recognition unit 31. That is, in general, it is known that a possibility of a subject on a travel lane being a moving object (e.g., a vehicle, a pedestrian and a bicycle) is relatively high. This subject type determination method is hereinafter referred to as "determination method using information on position with respect to white lane".

Further, when the subject is the moving object, the subject track calculation unit 33 calculates the track of the subject. For example, a moving speed of the subject in the front-and-rear direction (traveling direction of the vehicle 10) can be calculated based on the vehicle speed of the vehicle 10 and the relative speed between the vehicle 10 and the subject. A moving speed of the subject in the left-and-right direction can be calculated based on an amount of change in distance between a position of a side end of the subject and the white line, which is detected by the surroundings sensor 28, for example. The subject track calculation unit 33 calculates, based on the moving speeds of the subject in the front-and-rear direction and the left-and-right direction, a track of the subject, which is a change in position of the subject (target) during a period of time from the current time until a predetermined period of time passes. The track of the subject calculated in this manner is hereinafter referred to as "predicted target track". Alternatively, the subject track calculation unit 33 may calculate the predicted target track based on the calculated predicted vehicle track of the vehicle 10 and the distance between the vehicle 10 and the subject, which is detected by the surroundings sensor 28.

The obstacle determination unit 34 is configured to determine, based on the predicted vehicle track of the vehicle 10 and the predicted target track of the subject being the moving object, whether or not the vehicle 10 is likely to collide with the subject when the subject keeps a current movement state and the vehicle 10 keeps a current traveling state (that is, the speed and steering angles of the vehicle 10). In other words, the obstacle determination unit 34 determines that the vehicle 10 is likely to collide with the subject when the predicted vehicle track and the predicted target track interfere with each other.

The obstacle determination unit 34 is further configured to determine, based on the predicted vehicle track of the vehicle 10 and the position of the subject being the stationary object, whether or not the vehicle 10 is likely to collide with the subject when the subject keeps a stationary state and the vehicle 10 keeps the current traveling state. In other words, the obstacle determination unit 34 determines that the vehicle 10 is likely to collide with the subject when the predicted vehicle track of the vehicle 10 and the position of the subject interfere with each other.

When determining that the vehicle 10 is likely to collide with the subject, the obstacle determination unit 34 identifies the subject as an obstacle.

The result of determination made by the obstacle determination unit 34 as to whether or not the subject (target) is the obstacle is used for the alert control and the automatic brake control, which are described later. In other words, when the obstacle determination unit 34 determines that the subject positioned in front of the vehicle 10 is the obstacle, the alert control and the automatic brake control are executed.

The collision determination unit 35 is configured to calculate, based on a distance L between the obstacle and the vehicle 10 and a relative speed Vr of the vehicle 10 with respect to the obstacle transmitted from the surroundings sensor 28, a predicted time to collision TTC, which is a predicted period of time until the vehicle 10 collides with the obstacle, through Expression (1) given below.

$$TTC = L/Vr \quad (1)$$

When the predicted time to collision TTC is equal to or shorter than a collision determination threshold time set in advance, the collision determination unit 35 determines that the vehicle 10 is highly likely to collide with the obstacle.

In this embodiment, two types of collision determination threshold times are used. Specifically, a first collision determination threshold time TTCth1 or a second collision determination threshold time TTCth2 is used as the collision determination threshold time. The second collision determination threshold time TTCth2 is shorter than the first collision determination threshold time TTCth1.

When the predicted time to collision TTC becomes equal to or shorter than the first collision determination threshold time TTCth1 under a state in which the obstacle determination unit 34 determines that "the subject (target) positioned in front of the vehicle 10 is an obstacle", the collision determination unit 35 determines that "the vehicle 10 is highly likely to collide with the obstacle".

Then, the alert ECU 60 receives the operation signal from the support ECU 30, and causes the buzzer 20 and the display 21 to operate for a predetermined period of time. Specifically, for the predetermined period of time, the buzzer 20 beeps and the display 21 displays an operation state of the collision avoidance support control.

The target deceleration calculation unit 36 is configured to calculate a target deceleration at which the vehicle 10 is to be decelerated when the obstacle determination unit 34 determines that "the subject (target) positioned in front of the vehicle 10 is an obstacle".

For example, in a case where the obstacle is a stationary object, when the vehicle speed (=relative speed) of the vehicle 10 at the current time is represented by V, the deceleration of the vehicle 10 is represented by a, and a period of time until the vehicle 10 stops (that is, a period of time until the vehicle speed becomes zero) is represented by t, a travel distance X until the vehicle 10 stops can be expressed by Expression (2) given below.

$$X = V \cdot t + (\tfrac{1}{2}) \cdot a \cdot t^2 \quad (2)$$

The period of time t until the vehicle 10 stops can be expressed by Expression (3) given below.

$$t = V/a \quad (3)$$

Accordingly, through substitution of Expression (3) into Expression (2), the deceleration a required for stopping the vehicle 10 when the vehicle 10 travels for a travel distance D can be expressed by Expression (4) given below.

$$a = -V^2/2D \quad (4)$$

In order to stop the vehicle 10 at a position separated by a distance β from the obstacle toward the vehicle 10, it is only necessary to set the travel distance D to a distance (L-β) obtained by subtracting the distance β from the distance L detected by the surroundings sensor 28. When the obstacle is a moving object, it is only necessary to calculate the deceleration a by using the relative speed Vr in place of the vehicle speed V.

The target deceleration calculation unit 36 sets the deceleration a calculated in this manner as the target deceleration. There is a limit value to the deceleration of the vehicle 10 (e.g., approximately −1 G). Thus, when an absolute value of the calculated target deceleration is larger than a limit value (upper limit value) set in advance, the target deceleration calculation unit 36 sets the limit value as the absolute value of the target deceleration.

When the predicted time to collision TTC becomes equal to or shorter than the second collision determination threshold time TTCth2 after the alert ECU 60 causes the buzzer 20 and the display 21 to operate, the collision determination unit 35 determines that "the vehicle 10 is highly likely to collide with the obstacle".

Then, the control unit 38 transmits to the brake ECU 40 an operation signal indicating the target deceleration calculated by the target deceleration calculation unit 36. The brake ECU 40 then controls the brake actuator 23 based on the target deceleration. The friction brake mechanisms 22 then apply friction braking forces to the front wheels 16FW and the rear wheels 16RW. In other words, the automatic brake control is executed.

The avoidance target track calculation unit 37 is configured to calculate an avoidance target track (avoidance path) through which the vehicle 10 may pass to avoid collision with the obstacle when the obstacle determination unit 34 determines that "the subject (target) positioned in front of the vehicle 10 is an obstacle".

Figure 3:
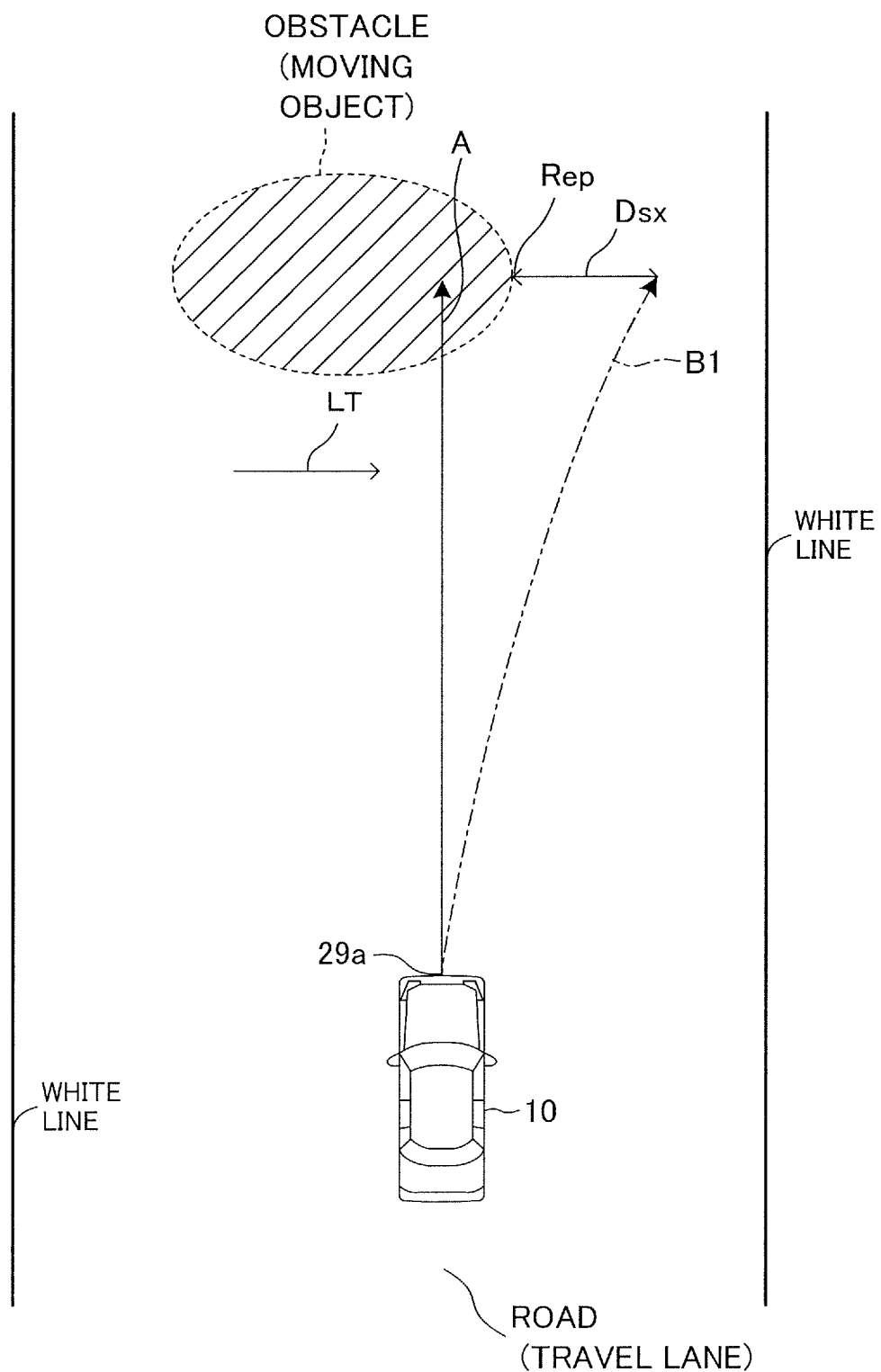
FIG. 3 is a plan view for illustrating a calculating method for avoidance paths of the vehicle when an obstacle is a moving object.

For example, as illustrated in FIG. 3, the avoidance target track calculation unit 37 calculates (identifies) a current path A through which the vehicle 10 passes when it is assumed that the vehicle 10 travels while keeping the current travel state in a case where the subject track calculation unit 33, which is mounted on the vehicle 10 travelling on the travel lane of the road, determines that "the subject (target) is a moving object moving in a direction of an arrow LT". Specifically, the avoidance target track calculation unit 37 calculates the current path A based on a lateral acceleration Gy0 currently acting on the vehicle 10 in the direction of the arrow LT. Further, the avoidance target track calculation unit 37 identifies a predicted path B1 through which the vehicle 10 is predicted to pass when a maximum change amount ΔGy of a lateral force that may act on the vehicle 10 is added to the current lateral acceleration Gy0. The maximum change amount ΔGy is a maximum value of a change amount of the lateral force that does not inhibit the vehicle 10 from safely turning at the vehicle speed at the current time. When the obstacle is a moving object moving in the direction of the arrow LT, the predicted path B1 is separated from the current path A in the direction of the arrow LT.

The avoidance target track calculation unit 37 further calculates a distance margin Dsx which is a distance in a width direction of the road between the right end Rep of the obstacle and the predicted path B1. The avoidance target track calculation unit 37 compares the distance margin Dsx with a predetermined moving obstacle limit value Vlm.

Accordingly, when determining that the distance margin Dsx is larger than the moving obstacle limit value Vlm, the avoidance target track calculation unit 37 identifies the predicted path B1 as a selected avoidance path.

Meanwhile, when determining that the distance margin Dsx is equal to or shorter than the moving obstacle limit value Vlm, the avoidance target track calculation unit 37 determines that "there is no selected avoidance path".

It should be noted that, the selected avoidance path when the obstacle is a moving object may be referred to as "selected avoidance path for moving obstacle Rfm".

Figure 4:
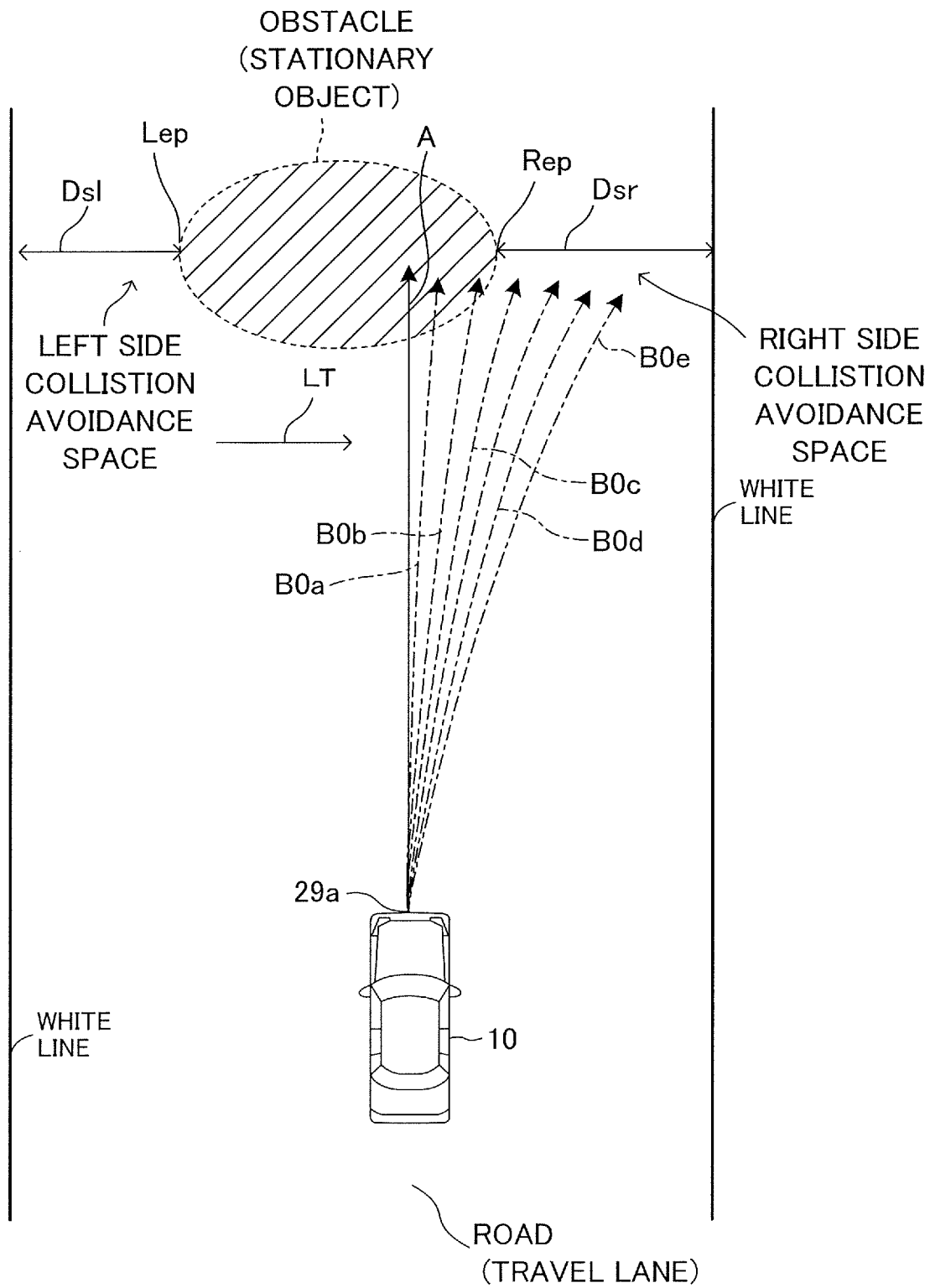
FIG. 4 is a plan view for illustrating a calculating method for avoidance paths of the vehicle when the obstacle is a stationary object.

Meanwhile, as illustrated in FIG. 4, the avoidance target track calculation unit 37 calculates (identifies) a current path A through which the vehicle 10 passes when it is assumed that the vehicle 10 travels while keeping the current travel state in a case where the subject track calculation unit 33, which is mounted on the vehicle 10 travelling on the travel lane of the road, determines that "the subject (target) is a stationary object".

The avoidance target track calculation unit 37 further calculates how much collision avoidance spaces exist on both left and right sides of the obstacle respectively based on target information. When, for example, white lines are drawn on both left and right side ends of the travel lane, the avoidance target track calculation unit 37 identifies (calculates) a collision avoidance distance Dsl which is a distance between the left side white line and the left end Lep of the obstacle as a width of the left side collision avoidance space, and the avoidance target track calculation unit 37 identifies (calculates) a collision avoidance distance Dsr which is a distance between the right side white line and the right end Rep of the obstacle as a width of the right side collision avoidance space.

When, for example, the collision avoidance distance Dsr is longer than the collision avoidance distance Dsl, the avoidance target track calculation unit 37 selects the right collision avoidance space as a selected collision avoidance space.

The avoidance target track calculation unit 37 further can calculate a plurality of avoidance paths, which correspond to values obtained by increasing (changing) the value of the lateral acceleration Gy0 currently acting on the vehicle 10 in the direction of the arrow LT by a fixed amount respectively and passes through the selected collision avoidance space, as predicted paths B0$a$, B0$b$, B0$c$, B0$d$ and B0$e$, etc in that order.

Accordingly, when the distance margin Dsx of a predicted path is larger than the stationary obstacle limit value Vls, the avoidance target track calculation unit 37 stops calculating predicted paths. Further, the avoidance target track calculation unit 37 identifies the predicted path whose the distance margin Dsx is larger than the stationary obstacle limit value Vls as the selected avoidance path. That is, when determining that the distance margin Dsx of a given predicted path is larger than the stationary obstacle limit value Vls, the avoidance target track calculation unit 37 will not calculate predicted paths any more.

For example, when each of distance margins Dsx of the predicted paths B0$a$ and B0$b$ with respect to the obstacle is equal to shorter than the stationary obstacle limit value Vls, and the distance margins Dsx of predicted paths B0$c$ with respect to the obstacle is larger than the stationary obstacle limit value Vls, the avoidance target track calculation unit 37 will not calculate the predicted paths B0$d$, B0$e$, and etc.

Accordingly, the avoidance target track calculation unit 37 identifies the predicted path B0$c$ as a selected avoidance path.

When the distance margin Dsx of the predicted path B0$e$ with respect to the obstacle is equal to or shorter than the stationary obstacle limit value Vls under a state where, for example, a path when the lateral acceleration Gy0 is increased (changed) so as to be its maximum value is the predicted path B0$e$, the avoidance target track calculation unit 37 determines that "there is no selected avoidance path".

It should be noted that, the selected avoidance path when the obstacle is a stationary object may be referred to as "selected avoidance path for stationary obstacle Rfs".

The stationary obstacle limit value Vls is a value smaller than the moving obstacle limit value Vlm. It should be noted that, the stationary obstacle limit value Vls and the moving obstacle limit value Vlm are recorded in a memory of the support ECU 30.

Therefore, the distance margin Dsx when the vehicle 10 traveling along the selected avoidance path for moving obstacle Rfm is positioned on a side (e.g., right side) of the obstacle is larger than the distance margin Dsx when the vehicle 10 traveling along the selected avoidance path for stationary obstacle Rfs is positioned on a side (e.g., right side) of the obstacle.

The selected avoidance path is set within a range in which the vehicle 10 does not depart from the travel lane on which the vehicle 10 is traveling and in which the ground is confirmed to be formed.

After identification of the selected avoidance path, the avoidance target track calculation unit 37 calculates a target yaw rate for causing the vehicle 10 to travel along the selected avoidance path.

The collision determination unit 35 determines whether or not "the travel distance X calculated based on an actual deceleration a and vehicle speed V at the current time is larger than a value (Lo-β) obtained by subtracting 13 from a distance L0 from the vehicle 10 to the obstacle at the current time". Then, when the travel distance X is larger than the value (L0-β), the collision determination unit 35 determines that "the vehicle 10 is highly likely to collide with the obstacle".

The control unit 38 then calculates a target steering angle at which the target yaw rate calculated by the avoidance target track calculation unit 37 can be obtained based on the target yaw rate and the vehicle speed of the vehicle 10. The control unit 38 then transmits an operation signal indicating the target steering angle to the steering ECU 50. The steering ECU 50 then drives the electric motor 18 based on the target steering angle to steer the front wheels 16FW and the rear wheels 16RW. In other words, the control unit 38 executes the automatic steering control for causing the vehicle 10 to travel along the selected avoidance path.

In this embodiment, the automatic brake control by the brake ECU 40 and the automatic steering control by the steering ECU 50 terminate at the same time when the collision determination unit 35 determines that "a predetermined control termination condition is satisfied". In this case, the control unit 38 transmits stop signals to the brake ECU 40 and the steering ECU 50.

In a case where the vehicle speed of the vehicle 10 is zero, even when the driver does not steer the steering wheel 15, the vehicle 10 is unlikely to depart from the travel lane on which the vehicle 10 is traveling to an adjacent travel lane.

Accordingly, in this embodiment, the control termination condition is satisfied when the vehicle speed of the vehicle 10 becomes zero.

Further, in a case where the traveling direction of the vehicle 10 is parallel to the white lines of the travel lane on which the vehicle 10 is traveling, even when the driver does not steer the steering wheel 15, the vehicle 10 is unlikely to depart from the current travel lane to the adjacent travel lane.

Still further, when the distance in a width direction of the travel lane from the vehicle 10 to one of the left and right white lines of the travel lane on which the vehicle 10 is traveling is longer than the distance in the width direction from the vehicle 10 to the other white line, and the vehicle 10 is traveling not in parallel to the other white line while approaching the one white line, even when the driver does not steer the steering wheel 15, the vehicle 10 is unlikely to pass through the other white line to depart from the travel lane on which the vehicle 10 is traveling to the adjacent travel lane.

Accordingly, in this embodiment, the control termination condition is satisfied when the lane recognition unit 31 determines that "the traveling direction of the vehicle 10 is parallel to the white lines" or when the lane recognition unit 31 determines that "the distance in the width direction of the travel lane from the vehicle 10 to one of the left and right white lines of the travel lane on which the vehicle 10 is traveling is longer than the distance in the width direction from the vehicle 10 to the other white line, and the vehicle 10 is traveling not in parallel to the other white line while approaching the one white line".

Figure 5:
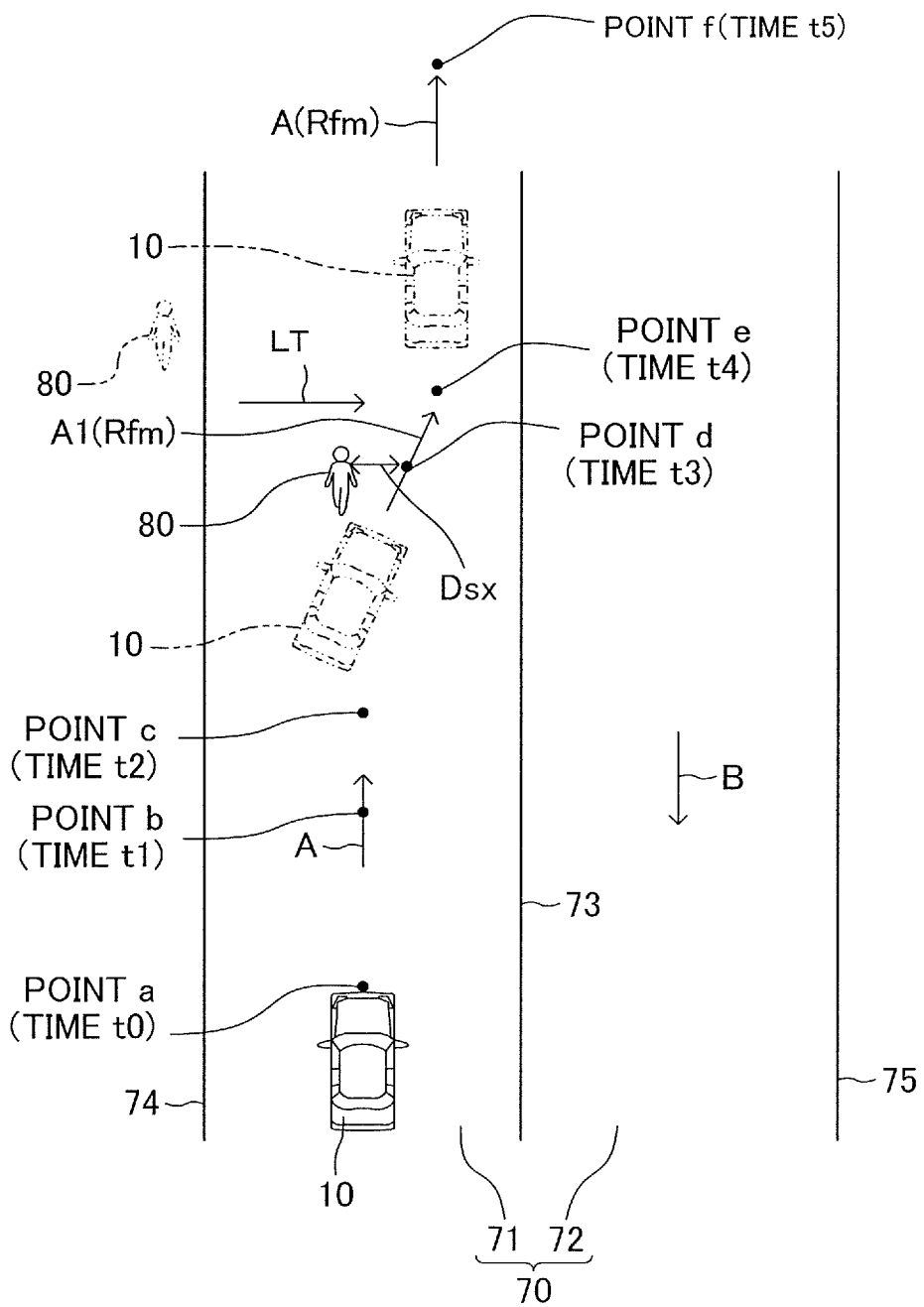
FIG. 5 is a plan view for illustrating how the vehicle travels on a road on which a pedestrian stands.
Figure 6:
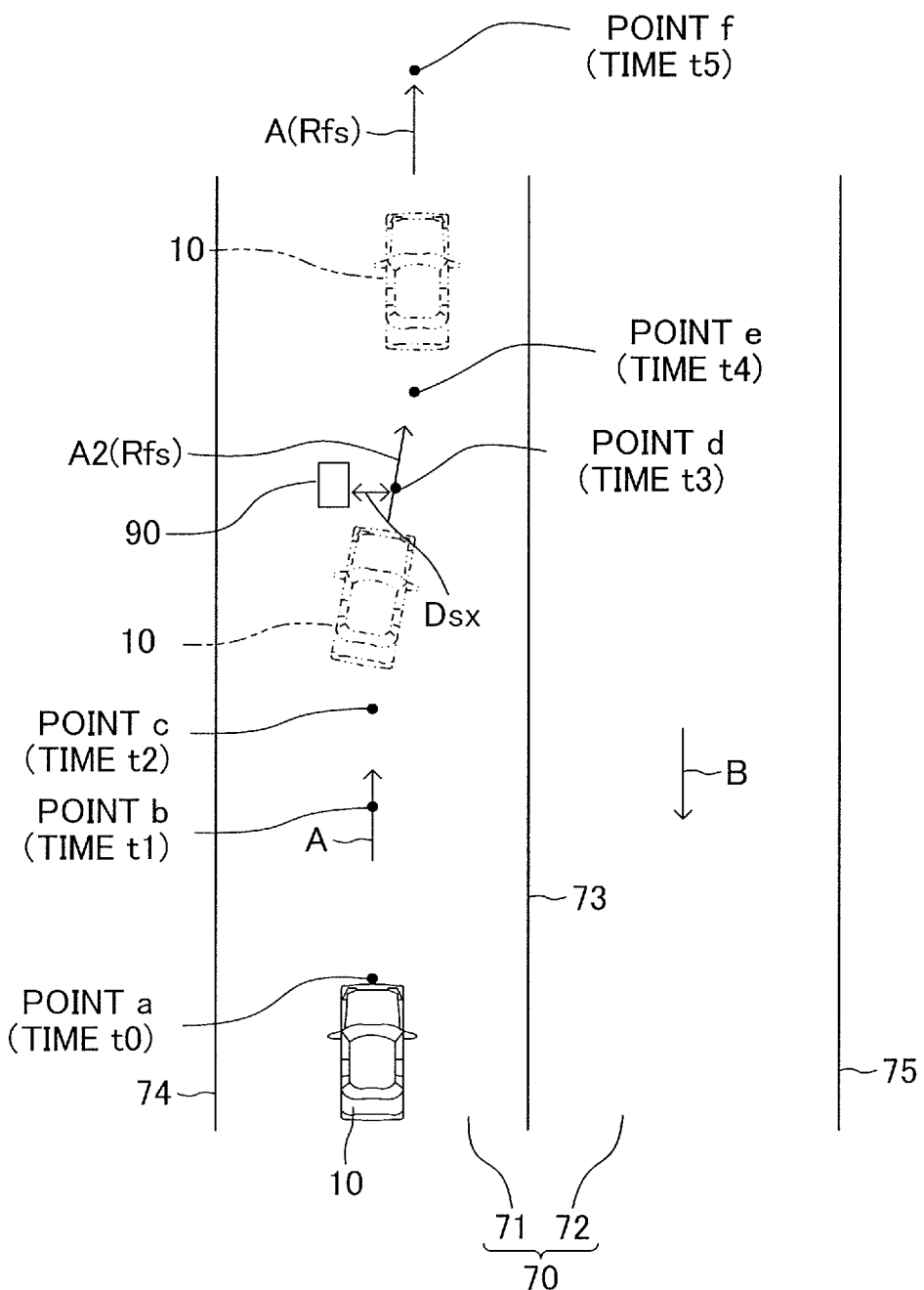
FIG. 6 is a plan view for illustrating how the vehicle travels on a road on which a sign board stands.

Next, a case where the vehicle 10 travels on a road 70 illustrated in FIGS. 5 and 6 is described.

The road 70 is a road having one lane on each side. Specifically, the road 70 includes a travel lane 71 and a travel lane 72. The vehicle 10 travels on the travel lane 71 in a direction of an arrow A, which is parallel to an extending direction of the road 70. Meanwhile, a vehicle (not shown) different from the vehicle 10 travels on the travel lane 72 in a direction of an arrow B. A white line 73 (median separation line) for separating the travel lane 71 and the travel lane 72 from each other is drawn between those travel lanes. A white line 74 is drawn on a side end of the travel lane 71 opposite to the white line 73, whereas a white line 75 is drawn on a side end of the travel lane 72 opposite to the white line 73. The white lines 73, 74, and 75 are parallel to one another.

A pedestrian 80 being a moving object is positioned on the travel lane 71 illustrated in FIG. 5. As illustrated, the pedestrian 80 is positioned between the white line 73 and the white line 74.

The pedestrian 80 is going across the travel lane 71 in the direction of the arrow LT. In other words, the pedestrian 80 is moving on the travel lane 71 from the left side thereof to the right side thereof.

When the front end of the vehicle 10 reaches a point a, the collision determination unit 35 determines that "the predicted time to collision TTC is equal to or shorter than the first collision determination threshold time TTCth1". In other words, the collision determination unit 35 determines that "the vehicle 10 is highly likely to collide with the obstacle".

Then, the alert ECU 60 follows the operation signal from the support ECU 30 to cause the buzzer 20 to beep and cause the display 21 to display an operation state of the collision avoidance support control. Noted that time at this time is a time t0.

When the front end of the vehicle 10 reaches a point b, the collision determination unit 35 determines that "the predicted time to collision TTC is equal to or shorter than the second collision determination threshold time TTCth2". In other words, the collision determination unit 35 determines that "the vehicle 10 is highly likely to collide with the obstacle".

Then, the brake ECU 40 starts the automatic brake control. Noted that time at this time is a time t1.

When the front end of the vehicle 10 reaches a point c, the collision determination unit 35 determines that "the travel distance X is larger than the value (L0-β)". In other words, the collision determination unit 35 determines that "the vehicle 10 is highly likely to collide with the obstacle".

Then, the steering ECU 50, based on the calculated selected avoidance path for moving obstacle Rfm, starts the automatic steering control. Noted that time at this time is a time t2.

Then, at the time t2, the vehicle 10 changes the traveling direction to a direction of an arrow A1, which is aligned with the selected avoidance path for moving obstacle Rfm, to thereby avoid collision with the pedestrian 80.

Further, when the front end of the vehicle 10 reaches a point d at a time t3, which comes after the time t2, the vehicle 10 is positioned on the right side of the pedestrian 80.

Further, when the front end of the vehicle 10 reaches a point e at a time t4, which comes after the time t3, the vehicle 10 changes the traveling direction to the direction of the arrow A1, which is aligned with the selected avoidance path for moving obstacle Rfm, again.

Further, when the front end of the vehicle 10 reaches a point f at a time t5, which comes after the time t4, the collision determination unit 35 determines that "the control termination condition is satisfied" because the vehicle speed of the vehicle 10 becomes zero. Accordingly, the steering ECU 50 immediately terminates the automatic steering control and the brake ECU 40 immediately terminates the automatic brake control.

The vehicle 10 passes through the point d, which is on the right side of the pedestrian 80, at time t3.

At this time, the pedestrian 80 is moving in the direction of the arrow LT. In other words, the pedestrian 80 is moving in a direction approaching the point d.

However, the distance margin Dsx between the pedestrian 80 and the vehicle 10 when the vehicle 10 traveling along the selected avoidance path for moving obstacle Rfm is positioned at the point d is larger (compared with the case where the vehicle 10 travels along the selected avoidance path for stationary obstacle Rfs).

Thus, although in this case the obstacle is a moving object (the pedestrian 80), the vehicle 10 traveling along the selected avoidance path for moving obstacle Rfm is highly unlikely to collide with the obstacle (the pedestrian 80).

A sign board 90 being a stationary object is located on the travel lane 71 illustrated in FIG. 6. This sign board 90 represents that a construction is being carried out on a part of the travel lane 71.

The points a through e and each time illustrated in FIG.6 correspond to the points a through e and each time illustrated in FIG.5, respectively.

Also in this case, when the front end of the vehicle 10 reaches the point c at a time t2, the steering ECU 50 starts the automatic steering control based on the calculated selected avoidance path for stationary obstacle Rfs.

Then, at the time t2, the vehicle 10 changes the traveling direction to a direction of an arrow A2, which is aligned with the selected avoidance path for stationary obstacle Rfs, to thereby avoid collision with the sign board 90.

The vehicle 10 passes through the point d, which is on the right side of the sign board 90, at time t3.

The distance margin Dsx between the sign board 90 and the vehicle 10 when the vehicle 10 traveling along the selected avoidance path for stationary obstacle Rfs is positioned at the point d is smaller (compared with the case where the vehicle 10 travels along the selected avoidance path for moving obstacle Rfm).

However, the sign board 90 does not move in a direction approaching the point d.

Thus, although in this case the distance margin Dsx is small, the vehicle 10 traveling along the selected avoidance path for stationary obstacle Rfs is highly unlikely to collide with the obstacle (the sign board 90).

Furthermore, a turning radius of the vehicle 10 when the vehicle 10 travels along the direction of the arrow A2 (the selected avoidance path for stationary obstacle Rfs) does not become small more than necessary because the distance margin Dsx is small. Thus, the behavior of the vehicle 10, which is executing the automatic steering control, is highly unlikely to be unstable more than necessary.

For example, in theory, the selected avoidance path can be calculated in the following manner.

That is, the avoidance target track calculation unit 37 firstly calculates the current path A regardless of which of a moving object and a stationary object the obstacle is.

Next, the avoidance target track calculation unit 37 calculates a plurality of predicted paths (for example, the predicted paths B0a, B0b, B0c, B0d and B0e illustrated in FIG. 4) by increasing (changing) the value of the lateral acceleration Gy0 currently acting on the vehicle 10 in the direction of the arrow LT by a fixed amount.

The avoidance target track calculation unit 37 further determines whether or not the distance margin of each of the all calculated predicted paths is larger than a predetermined limit value.

The avoidance target track calculation unit 37 identifies the predicted path whose distance margin is the smallest among all the predicted paths having distance margins larger than the limit value as the selected avoidance path.

However, when the selected avoidance path is identified in this following manner, only one predicted path is actually used as the selected avoidance path among all the predicted paths calculated by the avoidance target track calculation unit 37. In other words, the other predicted paths are not used as the selected avoidance path.

Thus, in this case, selected avoidance path calculation time of the avoidance target track calculation unit 37 becomes long more than necessary, and calculation load of the avoidance target track calculation unit 37 becomes large more than necessary.

On the other hand, the avoidance target track calculation unit 37 of the present embodiment calculates only one predicted path when a moving object is the obstacle. The number of predicted paths calculated by the avoidance target track calculation unit 37 is a minimum necessary number when a stationary object is the obstacle.

Thus, selected avoidance path calculation time of the avoidance target track calculation unit 37 of the present embodiment is short, and calculation load of the avoidance target track calculation unit 37 is small.

Next, referring to flowcharts of FIG. 7 to FIG. 12, specific processing performed by the support ECU 30, the brake ECU 40, the steering ECU 50, and the alert ECU 60 is described.

Figure 7:
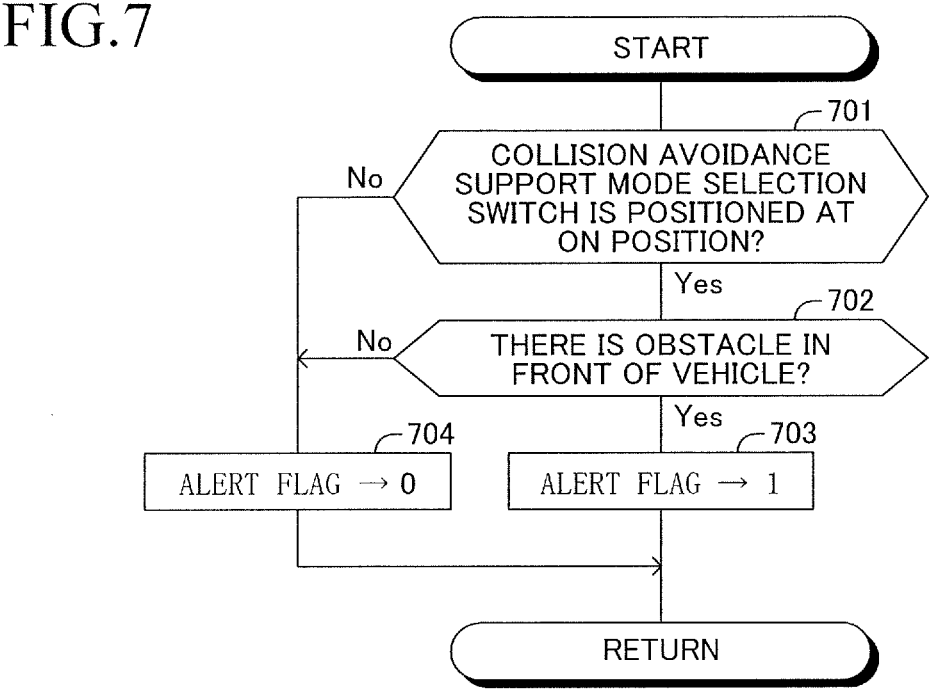
FIG. 7 is a flowchart for illustrating processing to be executed by a support ECU.

When a position of an ignition switch (not shown) of the vehicle 10 is switched from an off position to an on position through an operation of the ignition switch (not shown), the support ECU 30 repeatedly executes a routine illustrated in the flowchart of FIG. 7 every time a predetermined period of time passes.

First, in Step 701, the support ECU 30 determines whether or not the collision avoidance support mode selection switch is positioned at the on position.

When determining "Yes" in Step 701, the support ECU 30 proceeds to Step 702, and the obstacle determination unit 34 determines whether or not there is an obstacle in front of the vehicle 10.

When determining "Yes" in Step 702, the support ECU 30 proceeds to Step 703, and the collision determination unit 35 sets an alert flag to "1".

An initial value of the alert flag is "0".

When determining "No" in Step 701 or 702, the support ECU 30 proceeds to Step 704, and the collision determination unit 35 sets the alert flag to "0".

When finishing the processing of Step 703 or 704, the support ECU 30 temporarily terminates the processing of this routine.

Figure 8:
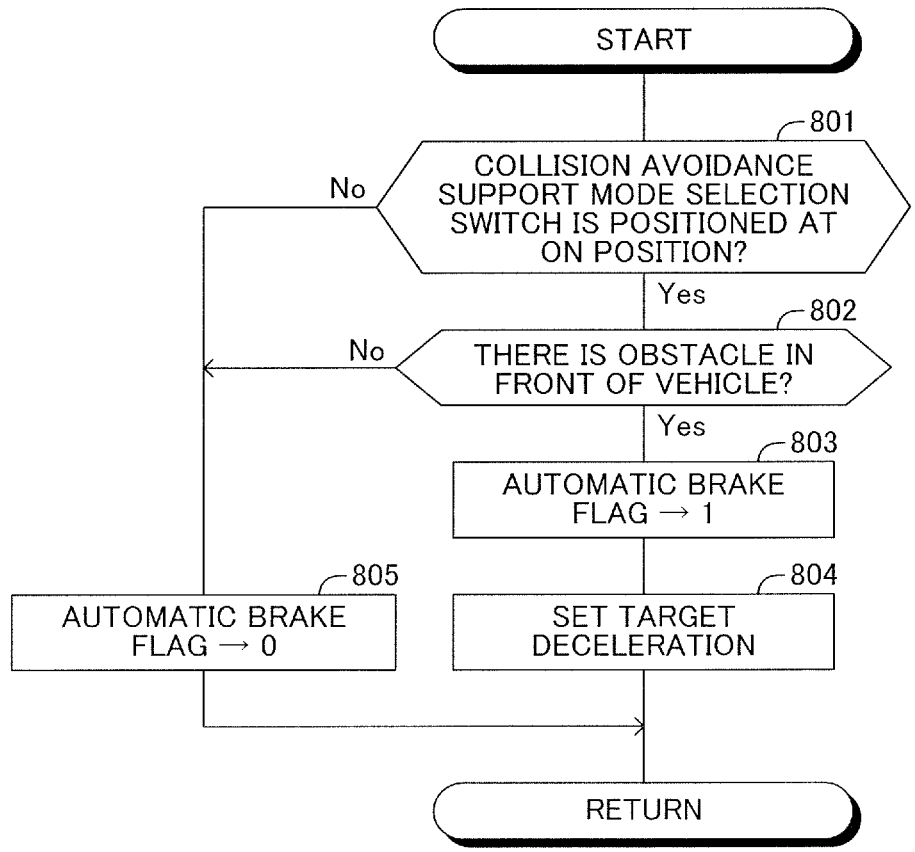
FIG. 8 is a flowchart for illustrating processing to be executed by the support ECU.

When the position of the ignition switch is switched from the off position to the on position, the support ECU 30 repeatedly executes a routine illustrated in the flowchart of FIG. 8 every time a predetermined period of time passes.

Each of the processing of Steps 801 and 802 is the same as the processing of Steps 701 and 702, respectively.

When determining "Yes" in Step 802, the support ECU 30 proceeds to Step 803, and the collision determination unit 35 sets an automatic brake flag to "1". An initial value of the automatic brake flag is "0".

When finishing the processing of Step 803, the support ECU 30 proceeds to Step 804, and the target deceleration calculation unit 36 sets the target deceleration.

When determining "No" in Step 801 or 802, the support ECU 30 proceeds to Step 805, and the collision determination unit 35 sets the automatic brake flag to "0".

When finishing the processing of Step 804 or 805, the support ECU 30 temporarily terminates the processing of this routine.

Figure 9:
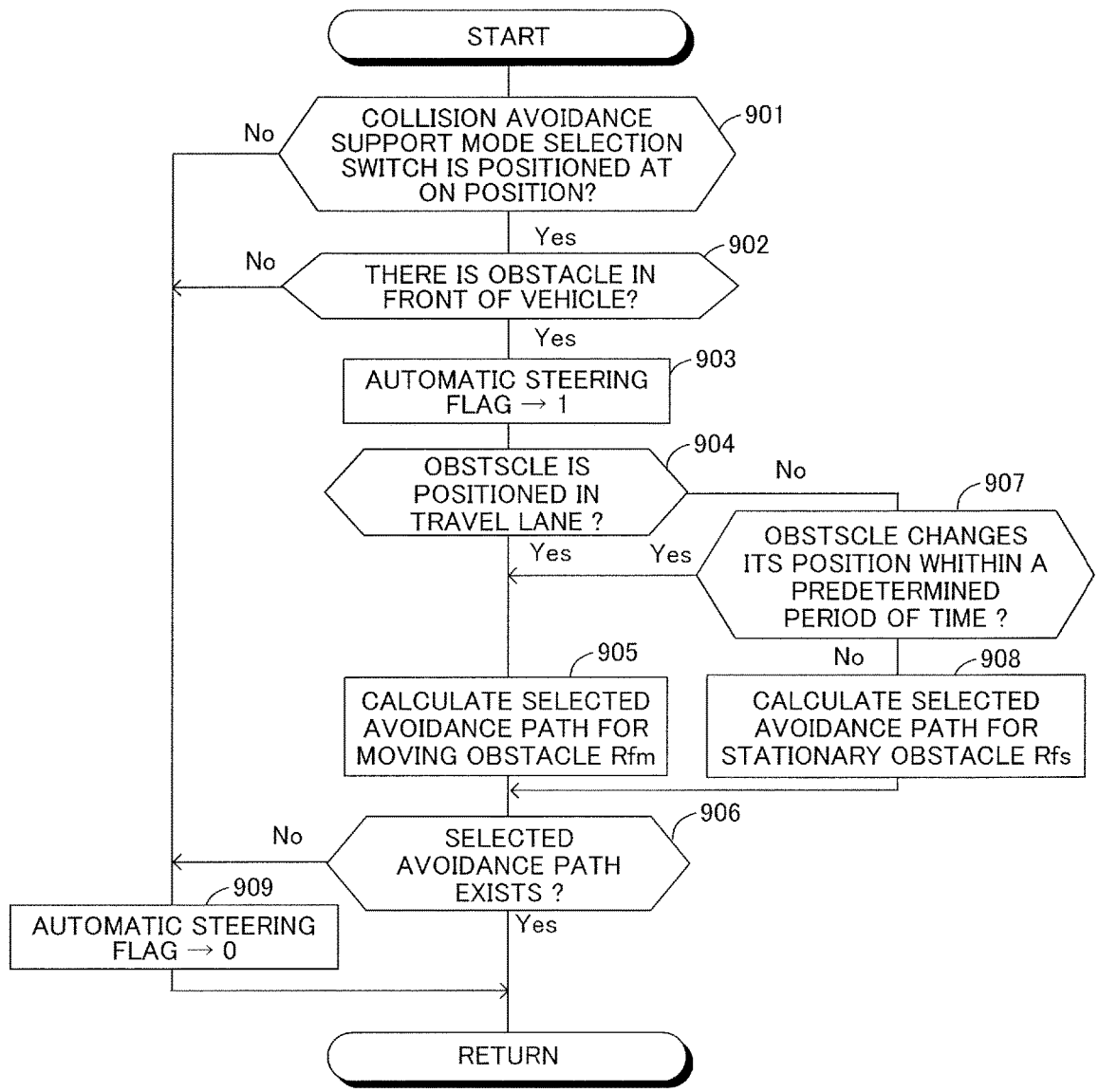
FIG. 9 is a flowchart for illustrating processing to be executed by the support ECU.

When the position of the ignition switch is switched from the off position to the on position, the support ECU 30 repeatedly executes a routine illustrated in the flowchart of FIG. 9 every time a predetermined period of time passes.

Each of the processing of Steps 901 and 902 is the same as the processing of Steps 701 and 702, respectively.

When determining "Yes" in Step 902, the support ECU 30 proceeds to Step 903, and the collision determination unit 35 sets an automatic steering flag to "1". An initial value of the automatic steering flag is "0".

When finishing the processing of Step 903, the support ECU 30 proceeds to Step 904, and the lane recognition unit 31 determines whether or not an obstacle is positioned between left and right white lines of a travel lane based on target information. That is, the lane recognition unit 31 determines that which of a moving object and a stationary object the obstacle is using the above mentioned determination method using information on position with respect to white lane.

When, for example, an obstacle (pedestrian 80, sign board 90) is positioned between left and right white lines 73, 74 of the travel lane 71 as illustrated in FIGS. 5 and 6, the support ECU 30 determines "Yes" in Step 904. That is, the support ECU 30 determines that "the obstacle is a moving object".

On the other hand, when, for example, the pedestrian 80 being an obstacle is positioned on the left side of the white line 74 as illustrated by the virtual line of FIG. 5, the support ECU 30 determines "No" in Step 904.

When determining "Yes" in Step 904, the support ECU 30 proceeds to Step 905, and the avoidance target track calculation unit 37 calculates the selected avoidance path for moving obstacle Rfm.

When finishing the processing of Step 905, the support ECU 30 proceeds to Step 906, and the avoidance target track calculation unit 37 determines whether or not there is a selected avoidance path for moving obstacle Rfm.

When determining "Yes" in Step 906, the support ECU 30 temporarily terminates the processing of this routine.

On the other hand, when determining "No" in Step 904, the support ECU 30 proceeds to Step 907, and the subject track calculation unit 33 determines whether or not the obstacle has changed its position within the predetermined period of time based on target information. That is, the subject track calculation unit 33 determines that which of a moving object and a stationary object the obstacle is using the above mentioned determination method using position change information.

For example, the pedestrian 80 illustrated by the virtual line of FIG. 5 is positioned outside of the white line 74. However, when the target information includes this pedestrian 80 and this pedestrian 80 moves within the predetermined period of time, the subject track calculation unit 33 determines "Yes" in Step 907. That is, the support ECU 30 determines that "the obstacle is a moving object".

When determining "Yes" in Step 907, the support ECU 30 proceeds to Step 905, and the avoidance target track calculation unit 37 calculates the selected avoidance path for moving obstacle Rfm.

On the other hand, when determining "No" in Step 907, the support ECU 30 proceeds to Step 908. That is, the support ECU 30 determines that "the obstacle is a stationary object". Then, the avoidance target track calculation unit 37 of the support ECU 30 calculates the selected avoidance path for stationary obstacle Rfs.

When finishing the processing of Step 908, the support ECU 30 proceeds to Step 906, and the avoidance target track calculation unit 37 determines whether or not there is a selected avoidance path for stationary obstacle Rfs.

When determining "Yes" in Step 906, the support ECU 30 temporarily terminates the processing of this routine.

When determining "No" in Step 901, 902, or 906, the support ECU 30 proceeds to Step 909, and the collision determination unit 35 sets the automatic steering flag to "0".

When finishing the processing of Step 909, the support ECU 30 temporarily terminates the processing of this routine.

Figure 10:
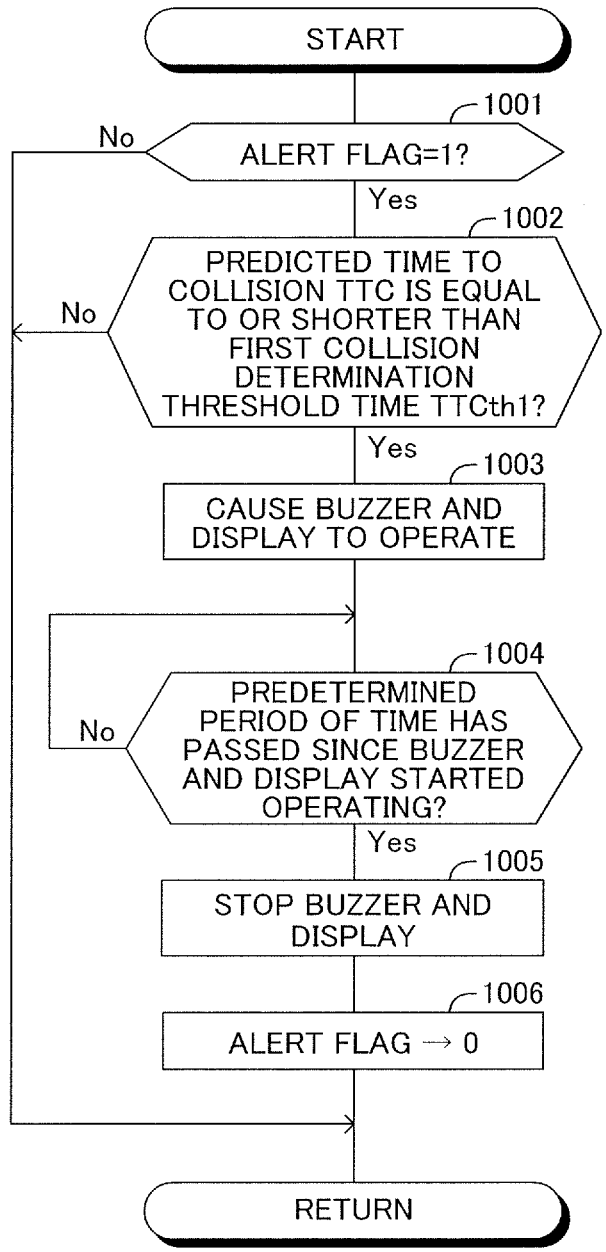
FIG. 10 is a flowchart for illustrating processing to be executed by the support ECU.

When the position of the ignition switch is switched from the off position to the on position, the support ECU 30 repeatedly executes a routine illustrated in the flowchart of FIG. 10 every time a predetermined period of time passes.

In Step 1001, the support ECU 30 determines whether or not the alert flag is "1".

When determining "Yes" in Step 1001, the support ECU 30 proceeds to Step 1002, and the collision determination unit 35 determines whether or not the predicted time to collision TTC is equal to or shorter than the first collision determination threshold time TTCth1.

When determining "Yes" in Step 1002, the support ECU 30 proceeds to Step 1003 to transmit the operation signal to the alert ECU 60. Then, the alert ECU 60 causes the buzzer 20 and the display 21 to operate.

When finishing the processing of Step 1003, the support ECU 30 proceeds to Step 1004 to determine whether or not a predetermined period of time has passed since the buzzer 20 and the display 21 started operating.

When determining "No" in Step 1004, the support ECU 30 repeats the processing of Step 1004.

Meanwhile, when determining "Yes" in Step 1004, the support ECU 30 proceeds to Step 1005 to transmit a stop signal to the alert ECU 60. Then, the alert ECU 60 stops the buzzer 20 and the display 21.

When finishing the processing of Step 1005, the support ECU 30 proceeds to Step 1006, and the collision determination unit 35 sets the alert flag to "0".

When the support ECU 30 determines "No" in Step 1001 or 1002, the support ECU 30 temporarily terminates the processing of this routine.

Figure 11:
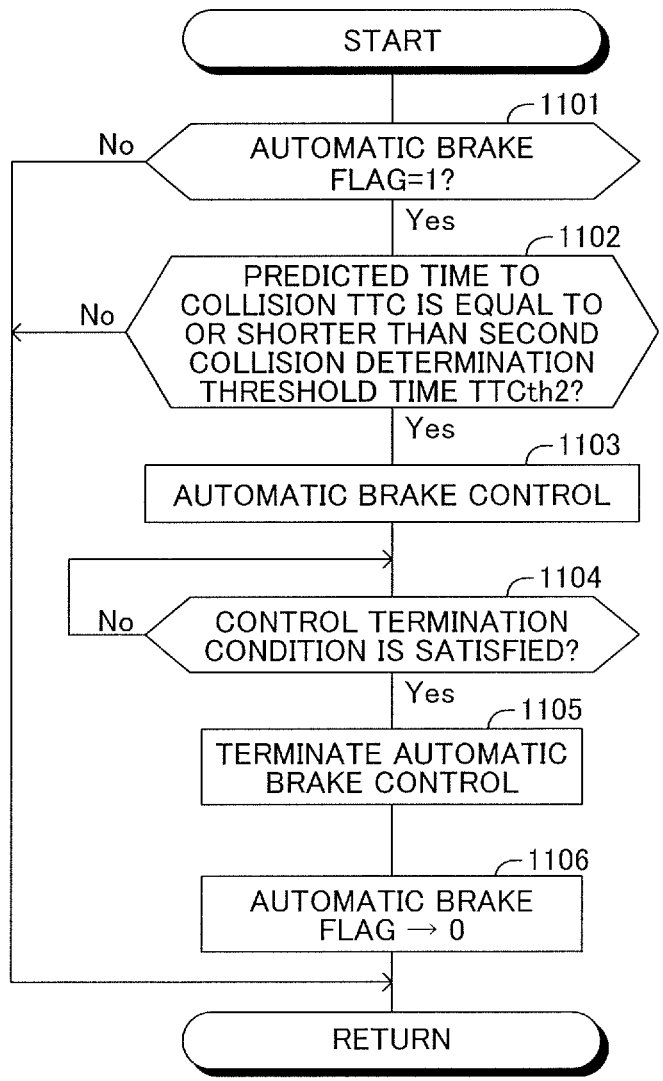
FIG. 11 is a flowchart for illustrating processing to be executed by the support ECU.

When the position of the ignition switch is switched from the off position to the on position, the support ECU 30 repeatedly executes a routine illustrated in the flowchart of FIG. 11 every time a predetermined period of time passes.

In Step 1101, the support ECU 30 determines whether or not the automatic brake flag is "1".

When determining "Yes" in Step 1101, the support ECU 30 proceeds to Step 1102, and the collision determination unit 35 determines whether or not the predicted time to collision TTC is equal to or shorter than the second collision determination threshold time TTCth2.

When determining "Yes" in Step 1102, the support ECU 30 proceeds to Step 1103 to transmit the operation signal to the brake ECU 40. Then, the brake ECU 40 starts the automatic brake control while using the target deceleration calculated in Step 804.

When finishing the processing of Step 1103, the support ECU 30 proceeds to Step 1104, and the collision determination unit 35 determines whether or not the control termination condition is satisfied.

When determining "No" in Step 1104, the support ECU 30 repeats the processing of Step 1104.

Meanwhile, when determining "Yes" in Step 1104, the support ECU 30 proceeds to Step 1105, and the control unit 38 transmits a stop signal to the brake ECU 40.

When finishing the processing of Step 1105, the support ECU 30 proceeds to Step 1106, and the collision determination unit 35 sets the automatic brake flag to "0".

When the support ECU 30 determines "No" in Step 1101 or 1102, or finishes the processing of Step 1106, the support ECU 30 temporarily terminates the processing of this routine.

Figure 12:
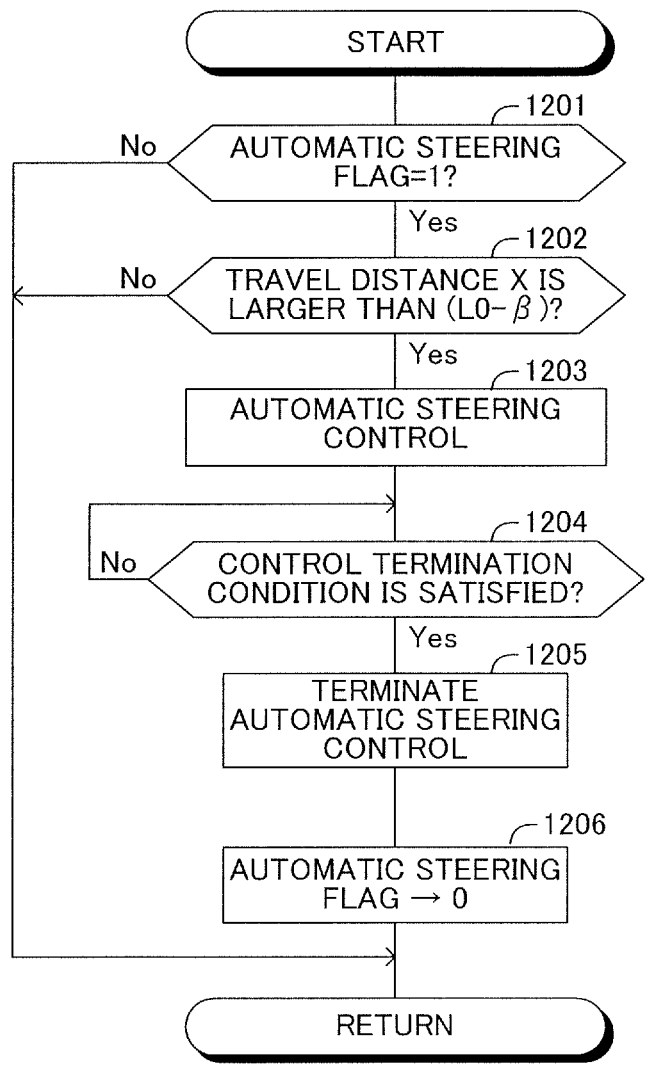
FIG. 12 is a flowchart for illustrating processing to be executed by the support ECU.

When the position of the ignition switch is switched from the off position to the on position, the support ECU 30 repeatedly executes a routine illustrated in the flowchart of FIG. 12 every time a predetermined period of time passes.

In Step 1201, the support ECU 30 determines whether or not the automatic steering flag is "1".

When determining "Yes" in Step 1201, the support ECU 30 proceeds to Step 1202 to determine whether or not the travel distance X is larger than the value (LO-β).

When determining "Yes" in Step 1202, the support ECU 30 proceeds to Step 1203 to transmit the operation signal to the steering ECU 50. Then, the steering ECU 50 causes the electric motor 18 to operate so that the vehicle 10 travels along the selected avoidance path calculated in Step 905 or Step 908. In other words, the steering ECU 50 starts the automatic steering control.

Detail of control in Step 1204 is the same as that in Step 1104.

When determining "Yes" in Step 1204, the support ECU 30 proceeds to Step 1205, and the control unit 38 transmits a stop signal to the steering ECU 50.

When finishing the processing of Step 1205, the support ECU 30 proceeds to Step 1206, and the collision determination unit 35 sets the automatic steering flag to "0".

When the support ECU 30 determines "No" in Step 1201 or 1202, or finishes the processing of Step 1206, the support ECU 30 temporarily terminates the processing of this routine.

In the above, the collision avoidance support device according to this embodiment has been described, but the present invention is not limited to the above-mentioned embodiment, and various changes are possible within the range not departing from the object of the present invention.

When the support ECU 30 executes the processing of the flowcharts of FIGS. 7 through 12, a problem on the sign board 90 illustrated in FIG. 6 may occur.

That is, when the target information includes the sign board 90 positioned on the travel lane, the lane recognition unit 31 determines that "this sign board 90 (obstacle) is positioned between left and right white lines of a travel lane" in Step 904. In other words, the support ECU 30 determines that the sign board 90 is a moving object, and then erroneously proceeds to Step 905.

That is, the determination accuracy of the determination method using information on position with respect to white lane is not very high.

Similarly, the determination accuracy of the determination method using position change information is not very high.

Figure 13:
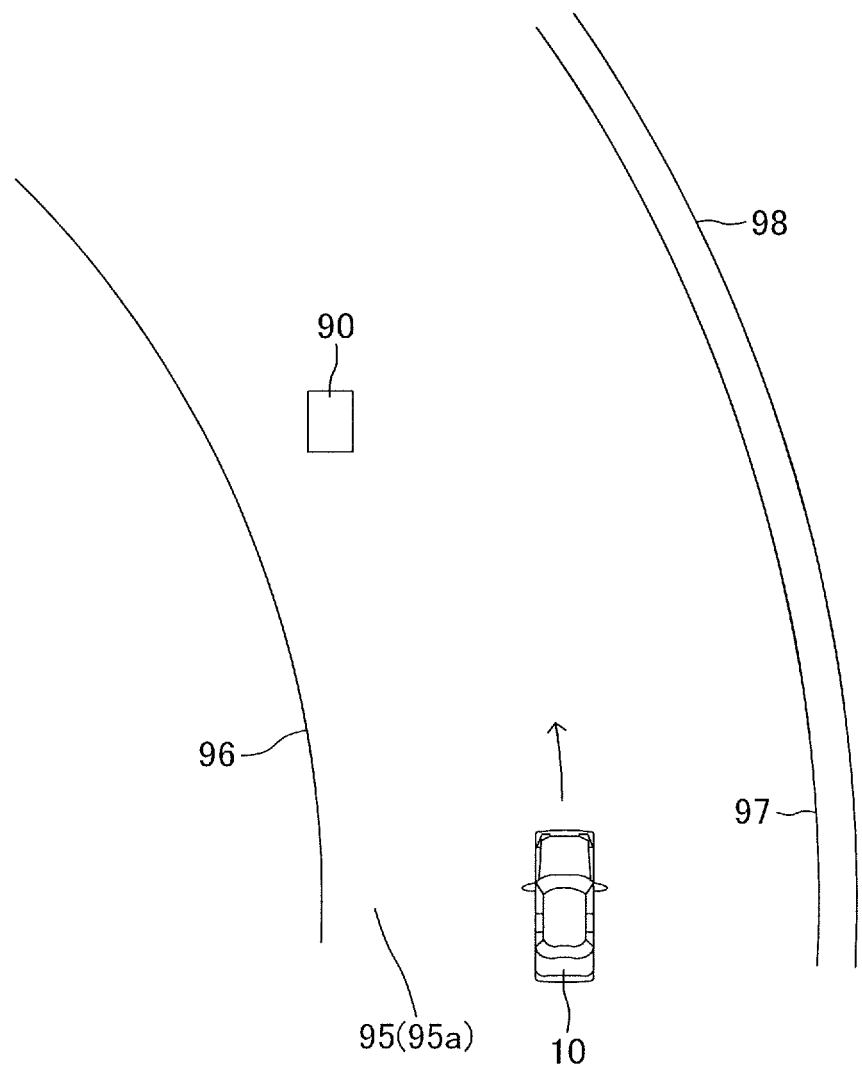
FIG. 13 is a plan view for illustrating how the vehicle travels on a road according to a modified embodiment of the present invention.
Figure 14:
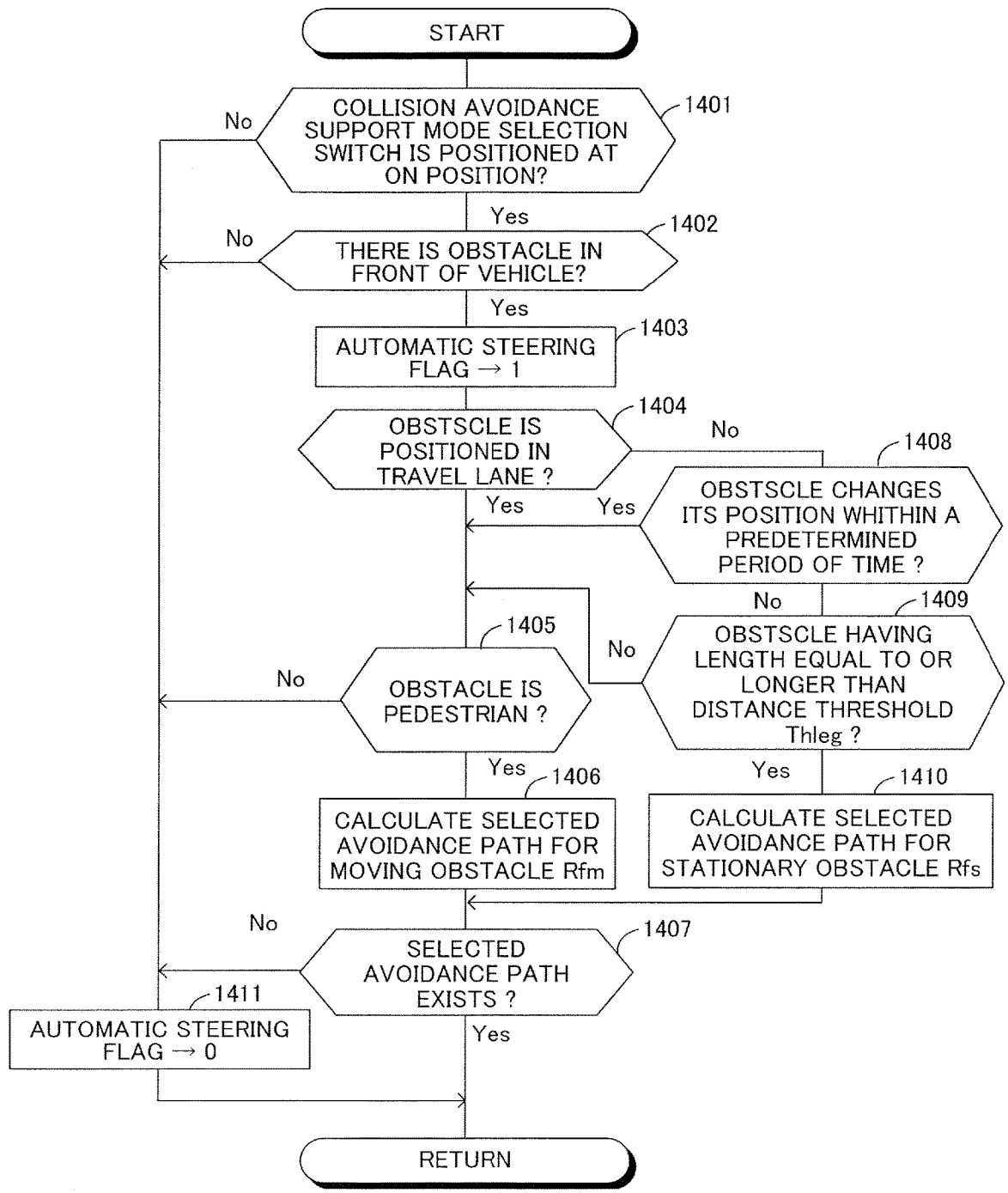
FIG. 14 is a flowchart for illustrating processing to be executed by the support ECU according to the modified embodiment.

Thus, for example, the present invention can be executed as a modified embodiment illustrated in FIGS. 13 and 14.

This modified embodiment is useful when, for example, the vehicle 10 travels on a road 95 illustrated in FIG. 13.

The road 95 has only one travel lane 95*a*. That is, the road 95 is a one-way road. The vehicle 10 travels on the road 95 in a direction of an arrow. The planar shape of the travel lane 95*a* is a curved shape.

White lines 96 and 97 are drawn on left and right side ends of the travel lane 95*a*.

Further, a guard rail 98, which is a long object extending in an extending direction of the travel lane 95*a*, is installed along the right side end of the travel lane 95*a*.

Further, a sign board 90 is positioned on the travel lane 95*a*. In other words, the sign board 90 is positioned between the left and right white lines 96 and 97.

In this modified embodiment, the support ECU 30 executes the processing of a flowchart of FIG. 14 in place of that of FIG. 9.

The flowchart of FIG. 14 is different from that of FIG. 9 in processing after Step 1404 corresponding to Step 904.

That is, when determining "Yes" in Step 1404, the support ECU 30 proceeds to Step 1405, and the subject track calculation unit 33 refers to the target information transmitted from the surroundings sensor 28.

When the target information transmitted from the surroundings sensor 28 represents that the target is a pedestrian, the subject track calculation unit 33 determines that this target (obstacle) is a moving object. Accordingly, the support ECU 30 proceeds to Step 1406.

When determining "No" in Step 1408, the support ECU 30 proceeds to Step 1409, and the subject track calculation unit 33 refers to the target information transmitted from the surroundings sensor 28.

Accordingly, the subject track calculation unit 33 refers to a determination result which is included in the target information transmitted from the surroundings sensor 28 and represent "whether or not the length of the obstacle in the travelling direction of the vehicle 10 is equal to or more than a predetermined distance threshold Thleg". The camera 29*b* obtains this determination result through pattern matching.

The value of the predetermined distance threshold Thleg is recored in a memory of the camera 29*b*. Further, the value of the predetermined distance threshold Thleg is, for example, 30 meters.

When, for example, the entire length of the guard rail 98 is 50 meters, the calculation means of the camera 29*b* determines that "the length of the target in the travelling direction of the vehicle 10 is equal to or more than the predetermined distance threshold Thleg". Then, the subject track calculation unit 33 determines that this target (obstacle) is a stationary object.

Thus, the support ECU 30 proceeds to Step 1410, and the avoidance target track calculation unit 37 calculates the selected avoidance path for stationary obstacle Rfs.

By the way, a pedestrian is highly likely to move. That is, when the target detected by the camera 29*b* is a pedestrian, reliability of determination that this target is a moving object by the camera 29*b* is high.

It is known that a long object which extends in the traveling direction of the vehicle 10 and has a length equal to or more than the predetermined distance threshold Thleg is highly likely to be a stationary object. That is, when the target detected by the camera 29*b* is such a long object, reliability of determination that this target is a stationary object by the camera 29*b* is high.

Thus, when determining "Yes" in Step 1405 or 1409, the support ECU 30 can cause the steering ECU 50 to execute the automatic steering control without occurring a problem.

On the other hand, when the target is different from a pedestrian and a long object having a length equal to or more than the predetermined distance threshold Thleg, reliability of the determination on "whether which of a moving object and a stationary object this target is" by the camera 29*b* (the subject track calculation unit 33) becomes lower compared with the case where the target is a pedestrian or a long object having a length equal to or more than the predetermined distance threshold Thleg.

Thus, when the support ECU 30 determines "No" in Step 1409 and "No" in Step 1405, the support ECU 30 proceeds to Step 1411. That is, the support ECU 30 determines "No" in Steps 1201, and the support ECU 30 dose not cause the steering ECU 50 to execute the automatic steering control.

On the other hand, when the obstacle is a target (e.g., the sign board 90) different from a pedestrian and a long object, the support ECU 30 determines "Yes" in Step 1101 in a case where the automatic brake flag is "1" to cause the brake ECU 40 to execute the automatic brake control.

When a long object (e.g., a wall), which is different from the guard rail 98 and has an entire length equal to or more than the predetermined distance threshold Thleg, is installed along a side end of the travel lane 95*a*, this long object is determined to be a stationary object with high reliability.

For example, the brake ECU 40 may be configured to execute "left and right brake balance adjustment control" corresponding to the automatic steering control.

The "left and right brake balance adjustment control" is known control in which magnitudes of the braking forces applied from the friction brake mechanisms 22 to the left front and rear wheels 16FW and 16RW and magnitudes of the braking forces applied from the friction brake mechanisms 22 to the right front and rear wheels 16FW and 16RW are made different from each other, to thereby adjust the traveling direction of the vehicle 10.

The automatic steering control and the left and right brake balance adjustment control are both an example of traveling direction automatic control.

When the driver operates the steering wheel 15 for rotation under a state in which the traveling direction automatic control is being executed, the steering ECU 50 (or the brake ECU 40) may immediately terminate the traveling direction automatic control and execute steering control (or the left and right brake balance adjustment control) corresponding to the driver's steering operation.

The termination time of the automatic brake control and the termination time of the traveling direction automatic control may be made different from each other.

The surroundings sensor 28 does not need to include the radar sensor 29*a* and the camera 29*b*. For example, the radar sensor 29*a* and a monocular camera may be used to form the surroundings sensor 28.

Information of a navigation system may be used as information representing the shape of the road (travel lane) on which the vehicle 10 travels and the positional relationship between the road and the vehicle 10.

Alert means may include only one of the buzzer 20 and the display 21.

What is claimed is:

1. A collision avoidance support device, comprising:
   a surroundings sensor, including a radar sensor and a camera, configured to acquire target information on a target on a road existing in front of a vehicle travelling on the road; and
   a control unit configured to:
      determine, using said acquired target information, which of a moving object and a stationary object said target is;
      determine, using said acquired target information, whether or not said target is an obstacle which is likely to collide with said vehicle;
      calculate an avoidance path which is a travelling path of said vehicle to avoid a collision with said obstacle;
      identify said avoidance path as a selected avoidance path when a distance margin which is a distance between said avoidance path and said obstacle in a width direction of said road is larger than a predetermined limit value; and
      execute traveling direction automatic control of changing a traveling direction of said vehicle so that said vehicle travels along said selected avoidance path, wherein, said control unit is configured to:
      when it is determined that said obstacle is said stationary object,
         calculate collision avoidance distances, which are distances in the width direction of said road and are distances of left and right collision avoidance spaces positioned on both left and right sides of said obstacle respectively,
         select one of said left and right collision avoidance spaces as a selected collision avoidance space, the selected one of the left and right collision avoidance spaces having said collision avoidance distance longer than said collision avoidance distance of the other of the left and right collision avoidance spaces;
      calculate a plurality of said avoidance paths passing through said selected collision avoidance space as a plurality of predicted paths in a predetermined order, said plurality of said avoidance paths corresponding to a plurality of values, which are each obtained by changing a lateral acceleration of said vehicle in the width direction of said road by a fixed amount from a lateral acceleration currently acting on said vehicle, respectively; and
      identify one of said predicted paths as said selected avoidance path when a distance margin between said predicted path and said obstacle being said stationary object in the width direction of said road calculated every time said predicted path is calculated becomes larger than a predetermined stationary obstacle limit value serving as said predetermined limit value, when it is determined that said obstacle is said moving object,
      calculate a predicted path which is said avoidance path by adding a maximum change amount corresponding to a lateral force capable of acting on said vehicle to said lateral acceleration currently acting on said vehicle; and
      identify said predicted path as said selected avoidance path when a distance margin between said predicted path and said obstacle being said moving object in the width direction of said road is larger than a predetermined moving obstacle limit value serving as said limit value, said predetermined moving obstacle limit value being larger than said predetermined stationary obstacle limit value.

2. A collision avoidance support device according to claim 1, wherein said control unit is configured to:
   acquire relative position between a travel lane on which said vehicle is traveling and said target, said travel lane being a part of said road; and
   determine, based on said relative position, that said target is said moving object when said target is positioned between a pair of white lines which are formed on left and right side ends of said travel lane respectively.

3. A collision avoidance support device according to claim 1, wherein said control unit is configured to:
   determine that said target is said moving object when said target is a pedestrian;
   determine that said target is said stationary object when said target is a long object which extends in a traveling direction of said vehicle and has a length equal to or more than a predetermined distance threshold; and
   be prohibited from executing said traveling direction automatic control when it is determined that said target is neither said pedestrian nor said long object.

* * * * *